US009169337B2

(12) United States Patent
Rohatgi et al.

(10) Patent No.: US 9,169,337 B2
(45) Date of Patent: Oct. 27, 2015

(54) POLYMERS WITH IMPROVED ESCR FOR BLOW MOLDING APPLICATIONS

(71) Applicant: Chevron Phillips Chemical Company LP, The Woodlands, TX (US)

(72) Inventors: Vivek Rohatgi, Owasso, OK (US); Jeffrey F. Greco, Tulsa, OK (US); Yongwoo Inn, Bartlesville, OK (US); Qing Yang, Bartlesville, OK (US); Alfred E. Brown, Jr., Collinsville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/205,461

(22) Filed: Mar. 12, 2014

(65) Prior Publication Data
US 2015/0259444 A1 Sep. 17, 2015

(51) Int. Cl.
*C08F 210/16* (2006.01)
*C08F 210/02* (2006.01)
*C08F 10/14* (2006.01)
*C08F 10/08* (2006.01)

(52) U.S. Cl.
CPC .............. *C08F 10/14* (2013.01); *C08F 10/08* (2013.01); *C08F 210/16* (2013.01); *C08F 2500/05* (2013.01); *C08F 2500/07* (2013.01); *C08F 2500/12* (2013.01)

(58) Field of Classification Search
CPC .............. C08F 210/16; C08F 2500/05; C08F 2500/07; C08F 2500/12
USPC .......................................................... 526/348
See application file for complete search history.

(56) References Cited

U.S. PATENT DOCUMENTS

| | | | |
|---|---|---|---|
| 3,242,099 A | 3/1966 | Manyik et al. | |
| 3,248,179 A | 4/1966 | Norwood | |
| 4,501,885 A | 2/1985 | Sherk et al. | |
| 4,588,790 A | 5/1986 | Jenkins, III et al. | |
| 4,794,096 A | 12/1988 | Ewen | |
| 4,808,561 A | 2/1989 | Welborn, Jr. | |
| 5,310,834 A | 5/1994 | Katzen et al. | |
| 5,350,818 A * | 9/1994 | Malpass, Jr. | 526/139 |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 5,576,259 A | 11/1996 | Hasegawa et al. | |
| 5,739,220 A | 4/1998 | Shamshoum et al. | |
| 5,807,938 A | 9/1998 | Kaneko et al. | |
| 5,919,983 A | 7/1999 | Rosen | |
| 6,107,230 A | 8/2000 | McDaniel et al. | |
| 6,165,929 A | 12/2000 | McDaniel et al. | |
| 6,239,235 B1 | 5/2001 | Hottovy et al. | |
| 6,262,191 B1 | 7/2001 | Hottovy et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,355,594 B1 | 3/2002 | McDaniel et al. | |
| 6,376,415 B1 | 4/2002 | McDaniel et al. | |
| 6,388,017 B1 | 5/2002 | McDaniel et al. | |
| 6,391,816 B1 | 5/2002 | McDaniel et al. | |
| 6,395,666 B1 | 5/2002 | McDaniel et al. | |
| 6,524,987 B1 | 2/2003 | Collins et al. | |
| 6,548,441 B1 | 4/2003 | McDaniel et al. | |
| 6,548,442 B1 | 4/2003 | McDaniel et al. | |
| 6,576,583 B1 | 6/2003 | McDaniel et al. | |
| 6,613,712 B1 | 9/2003 | McDaniel et al. | |
| 6,632,894 B1 | 10/2003 | McDaniel et al. | |
| 6,667,274 B1 | 12/2003 | Hawley et al. | |
| 6,750,302 B1 | 6/2004 | McDaniel et al. | |
| 6,787,608 B2 * | 9/2004 | VanDun et al. | 525/240 |
| 6,833,415 B2 | 12/2004 | Kendrick et al. | |
| 7,026,494 B1 | 4/2006 | Yang et al. | |
| 7,041,617 B2 | 5/2006 | Jensen et al. | |
| 7,199,073 B2 | 4/2007 | Martin | |
| 7,226,886 B2 * | 6/2007 | Jayaratne et al. | 502/129 |
| 7,294,599 B2 | 11/2007 | Jensen et al. | |
| 7,300,983 B2 | 11/2007 | Degroot et al. | |
| 7,312,283 B2 * | 12/2007 | Martin et al. | 526/116 |
| 7,517,939 B2 | 4/2009 | Yang et al. | |
| 7,601,665 B2 | 10/2009 | McDaniel et al. | |
| 7,619,047 B2 | 11/2009 | Yang et al. | |
| 7,858,702 B2 * | 12/2010 | Jaker | 525/191 |
| 7,884,163 B2 | 2/2011 | McDaniel et al. | |
| 7,919,639 B2 | 4/2011 | Murray et al. | |
| 8,080,681 B2 | 12/2011 | Murray et al. | |
| 8,114,946 B2 | 2/2012 | Yang et al. | |
| 8,138,113 B2 | 3/2012 | Yang et al. | |

(Continued)

OTHER PUBLICATIONS

U.S. Appl. No. 13/893,516 entitled "Peroxide Treated Metallocene-Based Polyolefins With Improved Melt Strength," filed May 14, 2013.

(Continued)

*Primary Examiner* — Rip A Lee

(74) *Attorney, Agent, or Firm* — Merchant & Gould, P.C.

(57) ABSTRACT

Disclosed herein are ethylene-based polymers having a higher molecular weight component and a lower molecular weight component, and characterized by a density greater than 0.945 g/cm$^3$, a melt index less than 1.5 g/10 min, and a ratio of high load melt index to melt index ranging from 40 to 175. These polymers have the processability of chromium-based resins, but with improved stiffness and stress crack resistance, and can be used in blow molding and other end-use applications.

27 Claims, 5 Drawing Sheets

(56) References Cited

U.S. PATENT DOCUMENTS

| | | | |
|---|---|---|---|
| 8,202,940 | B2 | 6/2012 | Jaker et al. |
| 8,309,485 | B2 | 11/2012 | Yang et al. |
| 8,318,883 | B1 * | 11/2012 | Yang et al. ............... 526/348.3 |
| 8,383,730 | B2 | 2/2013 | Jaker et al. |
| 8,383,754 | B2 | 2/2013 | Yang et al. |
| 8,623,973 | B1 | 1/2014 | McDaniel et al. |
| 8,691,715 | B2 * | 4/2014 | Yang et al. ............... 502/152 |
| 2004/0059070 | A1 | 3/2004 | Whitte |
| 2006/0235171 | A1 | 10/2006 | Lee et al. |
| 2014/0342141 | A1 | 11/2014 | Cui et al. |
| 2015/0065669 | A1 | 3/2015 | Hlavinka et al. |

OTHER PUBLICATIONS

U.S. Appl. No. 14/018,455 entitled "Higher Density Polyolefins With Improved Stress Crack Resistance," filed Sep. 5, 2013.

U.S. Appl. No. 14/205,422, entitled *Polymers With Improved Toughness and ESCR for Large-part Blow Molding Applications,*" filed Mar. 12, 2014.

Article entitled "SABIC Expands Product Portfolio by Adding Bimodal HDPE Blow Molding Grades for Bottles," published Mar. 5, 2013, 1 page.

Kapur, Mridula (Babli), article entitled "Next Generation HDPE for Blow Molding Applications," published in ANTEC 2009, pp. 65-69.

Marlex® HXB TR-512 Data Sheet, May 2007, 1 page.

Marlex® HXM 50100 Data Sheet, May 2007, 1 page.

Modern Plastics Encyclopedia, Mid-Nov. 1995 Issue, vol. 72, No. 12, 3 pages.

Film Extrusion Manual — Process, Materials, Properties, TAPPI Press, 1992, 16 pages.

Hieber et al., "Some correlations involving the shear viscosity of polystyrene melts," Rheologica Acta, 1989, vol. 28, pp. 321-332.

Hieber et al., "Shear-Rate-Dependence Modeling of Polymer Melt Viscosity," Polymer Engineering and Science, 1992, 32(14), pp. 931-938.

Bird et al., "Dynamics of Polymeric Liquids," vol. 1, Fluid Mechanics, 2nd Edition, John Wiley & Sons, 1987, 3 pages.

Janzen et al., "Diagnosing long-chain branching in polyethylenes," Journal of Molecular Structure, 1999, 485-486, pp. 569-584.

Wyatt, "Light scattering and the absolute characterization of macromolecules," Wyatt Technology Corporation, Analytica Chimica Acta, 272, 1993, pp. 1-40.

Arnett et al., "Zero-Shear Viscosity of Some Ethyl Branched Paraffinic Model Polymers," Journal of Physical Chemistry, 1980, 84(6), pp. 649-652.

Yu, et al. entitled "Long Chain Branches in Metallocene-Catalyzed Polyethylene Determined by a Combination of SEC/Multi-Angle Light Scattering, NMR and Rheology," published in *Polymer Preprints* 2003, vol. 44 (2), pp. 49-50.

\* cited by examiner

POLYMERS WITH IMPROVED ESCR FOR BLOW MOLDING APPLICATIONS

BACKGROUND OF THE INVENTION

Polyolefins such as high density polyethylene (HDPE) homopolymer and copolymer can be produced using various combinations of catalyst systems and polymerization processes. Chromium-based catalyst systems can, for example, produce olefin polymers having good extrusion processability and polymer melt strength, typically due to their broad molecular weight distribution (MWD).

In some end-use applications, such as blow molding, it can be beneficial to have the processability and melt strength similar to that of an olefin polymer produced from a chromium-based catalyst system, as well as improvements in toughness, impact strength, and environmental stress crack resistance (ESCR) at equivalent or higher polymer densities. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene polymers (e.g., ethylene/α-olefin copolymers) comprising a higher molecular weight component and a lower molecular weight component. In some aspects, the ethylene polymer can have a density of greater than or equal to about 0.945 g/cm$^3$ (e.g., from about 0.95 to about 0.965), a melt index (MI) of less than or equal to about 1.5 g/10 min, a ratio of high load melt index to melt index (HLMI/MI) in a range from about 40 to about 175, and a slope of a plot of the viscosity (Pa-sec) versus shear rate (sec$^{-1}$) of the ethylene polymer at 100 sec$^{-1}$ in a range from about 0.42 to about 0.65. In other aspects, the ethylene polymer can have a density of greater than or equal to about 0.945 g/cm$^3$ (e.g., from about 0.95 to about 0.965), a melt index (MI) of less than or equal to about 1.5 g/10 min, a ratio of high load melt index to melt index (HLMI/MI) in a range from about 40 to about 175, a peak molecular weight (Mp) of the higher molecular weight component in a range from about 650,000 to about 1,100,000 g/mol, a Mp of the lower molecular weight component in a range from about 40,000 to about 80,000 g/mol, and a ratio of Mw/Mn in a range from about 5 to about 18. These polymers, in further aspects, can be characterized by an environmental stress crack resistance (ESCR) of at least 200 hours (10% igepal), and/or an ESCR of at least 1000 hours (100% igepal), and/or a MI in a range from about 0.2 to about 0.8 g/10 min, and/or a ratio of HLMI/MI in a range from about 60 to about 160, and/or a density in a range from about 0.955 to about 0.965 g/cm$^3$, and/or a slope of a plot of the viscosity (Pa-sec) versus shear rate (sec$^{-1}$) of the ethylene polymer at 100 sec$^{-1}$ in a range from about 0.44 to about 0.55, and/or a Mw of the higher molecular weight component in a range from about 825,000 to about 1,500,000 g/mol, and/or a ratio of Mz/Mw of the lower molecular weight component in a range from about 1.5 to about 2.8, and/or a ratio of Mw/Mn in a range from about 6 to about 15, and/or less than or equal to about 22% of the higher molecular weight component (based on the total weight of the polymer), and/or less than about 0.008 long chain branches (LCB) per 1000 total carbon atoms, and/or a non-conventional (flat or reverse) comonomer distribution, and/or a bimodal molecular weight distribution, and/or a zero-shear viscosity in a range from about 1×10$^5$ to about 1×10$^7$ Pa-sec, and/or a zero-shear viscosity in a range from about 2×10$^6$ to about 1×10$^{12}$ Pa-sec (using the Carreau-Yasuda model with creep adjustment). These ethylene polymers can be used to produce various articles of manufacture, such as films, sheets, pipes, geomembranes, and blow molded bottles.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
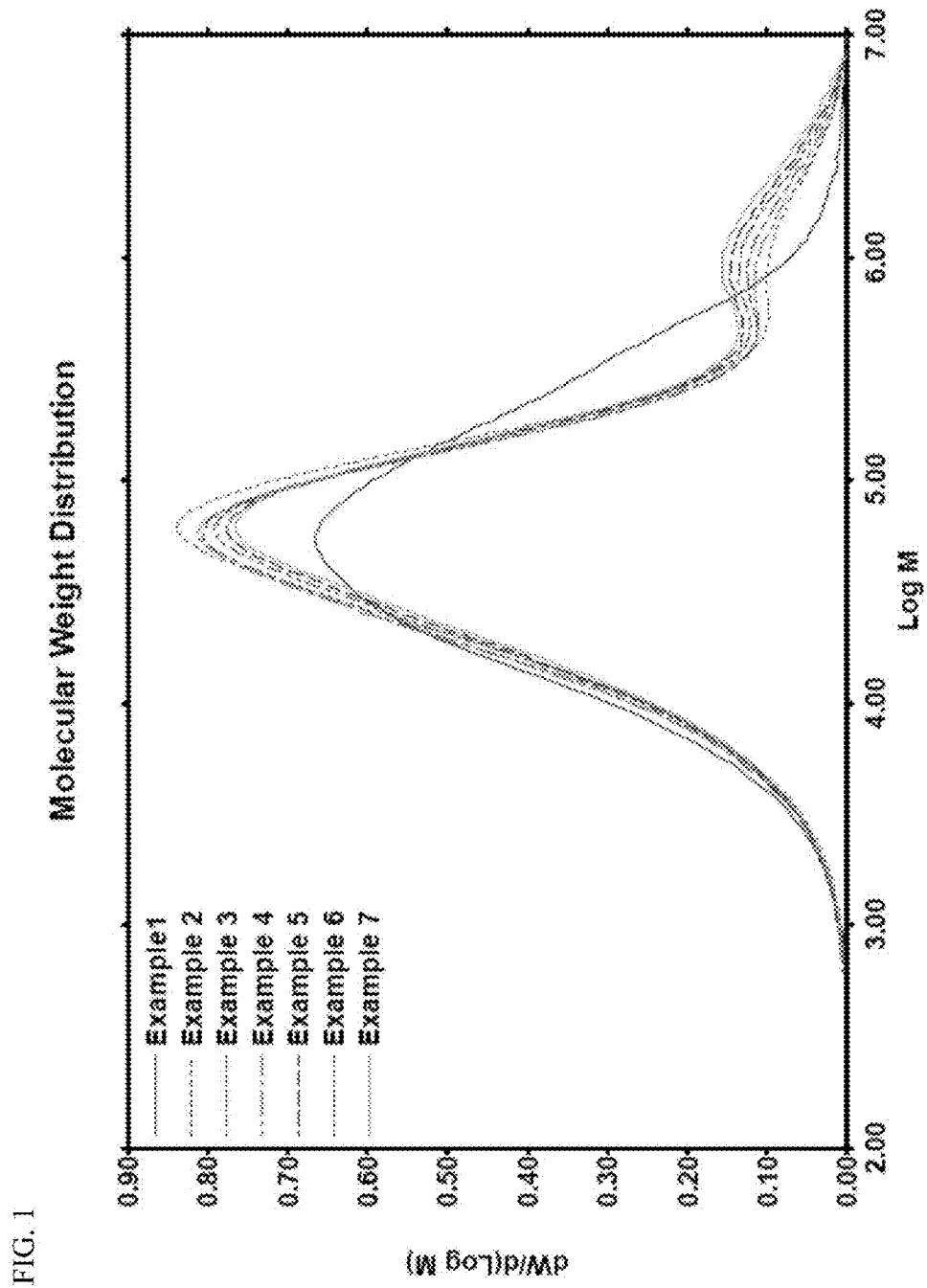
FIG. 1 presents a plot of the molecular weight distributions of the polymers of Examples 1-7.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; (i) catalyst component I, (ii) catalyst component II, (iii) an activator, and (iv) optionally, a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer.

In like manner, the scope of the term "polymerization" includes homopolymerization, copolymerization, terpolymerization, etc. Therefore, a copolymerization process can involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound(s), or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an ethylene polymer consistent with aspects of this invention. By a disclosure that the ratio of Mw/Mn can be in a range from about 5 to about 18, Applicants intend to recite that the ratio of Mw/Mn can be any ratio in the range and, for example, can be equal to about 5, about 6, about 7, about 8, about 9, about 10, about 11, about 12, about 13, about 14, about 15, about 16, about 17, or about 18. Additionally, the ratio of Mw/Mn can be within any range from about 5 to about 18 (for example, from about 6 to about 16), and this also includes any combination of ranges between about 5 and about 18 (for example, the Mw/Mn ratio can be in a range from about 5 to about 8, or from about 12 to about 18). Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The present invention is directed generally to higher density ethylene-based polymers having improved toughness, impact resistance, and environmental stress crack resistance (ESCR). Articles produced from these ethylene-based polymers, for example, using film/sheet extrusion, profile extrusion, or blow molding, are suitable for a variety of end-use applications.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; or alternatively, the olefin comonomer can comprise a $C_4$-$C_{10}$ α-olefin.

According to another aspect of this invention, the olefin monomer can comprise ethylene, and the olefin comonomer can include, but is not limited to, propylene, 1-butene, 1-pentene, 1-hexene, 1-heptene, 1-octene, and the like, or combinations thereof. In yet another aspect, the comonomer can comprise 1-butene, 1-hexene, 1-octene, or any combination thereof. In still another aspect, the comonomer can comprise 1-butene; alternatively, 1-hexene; or alternatively, 1-octene. Typically, the amount of the comonomer, based on the total weight of monomer (ethylene) and comonomer, can be in a range from about 0.01 to about 10 wt. %, from about 0.1 to about 5 wt. %, from about 0.15 to about 5 wt. %, from about 0.15 to about 2 wt. %, or from about 0.1 to about 1 wt. %.

In some aspects, the ethylene polymer of this invention can be an ethylene/α-olefin copolymer. For example, the ethylene polymer can be an ethylene/1-butene copolymer, an ethylene/1-hexene copolymer, or an ethylene/1-octene copolymer. In particular aspects contemplated herein, the ethylene polymer can be an ethylene/1-hexene copolymer.

Certain aspects of this invention are directed to improved polyolefin resins for blow molding applications, as compared to conventional resins produced using chromium-based catalyst systems. Conventional chromium-based resins for blow molding applications generally have a broad MWD, acceptable die swell, high melt strength, and overall excellent processability on a wide range of blow molding machinery. Notwithstanding these benefits, improvements in toughness, impact strength, stiffness, and ESCR are desired, while maintaining substantially no melt fracture, substantially no gels that can cause pinholes, substantially no char or black specs, substantially no smoke and odor, and good trimmability. Ethylene polymers described herein, in certain aspects, can provide a unique combination of the ease of processing typically associated with conventional chromium-based resins (e.g., acceptable die swell, high melt strength, etc.), along with improvements in toughness, stiffness (e.g., higher density), impact strength, and ESCR over conventional chromium-based resins. Such improvements can result in blow molded parts or articles with longer lifetimes, and may allow processors the opportunity to downgauge or thin-wall the blow molded parts or articles, resulting in decreased resin usage and cost reduction.

The ethylene polymers (e.g., ethylene copolymers) described herein can have a lower molecular weight component and a higher molecular weight component. An illustrative and non-limiting example of an ethylene polymer of the present invention can have a density of greater than or equal to about 0.945 g/cm³ (e.g., from about 0.95 to about 0.965), a melt index (MI) of less than or equal to about 1.5 g/10 min, a ratio of high load melt index to melt index (HLMI/MI) in a range from about 40 to about 175, and a slope of a plot of the viscosity (Pa-sec) versus shear rate (sec$^{-1}$) of the ethylene polymer at 100 sec$^{-1}$ in a range from about 0.42 to about 0.65. Another illustrative and non-limiting example of an ethylene polymer of the present invention can have a density of greater than or equal to about 0.945 g/cm³ (e.g., from about 0.95 to about 0.965), a melt index (MI) of less than or equal to about 1.5 g/10 min, a ratio of high load melt index to melt index (HLMI/MI) in a range from about 40 to about 175, a peak molecular weight (Mp) of the higher molecular weight component in a range from about 650,000 to about 1,100,000 g/mol, a Mp of the lower molecular weight component in a range from about 40,000 to about 80,000 g/mol, and a ratio of Mw/Mn in a range from about 5 to about 18. These illustrative and non-limiting examples of ethylene polymers consistent with the present invention also can have any of the polymer properties listed below and in any combination.

Ethylene polymers (homopolymers, copolymers, etc.) of this invention generally can have a melt index (MI) from 0 to about 1.5 g/10 min. Melt indices in the range from 0 to about 1.2, from 0 to about 1, from about 0.05 to about 1.2, or from about 0.1 to about 1 g/10 min, are contemplated in other aspects of this invention. For example, a polymer of the present invention can have a MI in a range from about 0.1 to about 0.9, from about 0.2 to about 0.9, or from about 0.2 to about 0.8 g/10 min.

Consistent with certain aspects of this invention, ethylene polymers described herein can have a high load melt index (HLMI) in a range from about 15 to about 100, from about 20 to about 100, from about 15 to about 90, or from about 20 to about 90 g/10 min. In further aspects, ethylene polymers described herein can have a HLMI in a range from about 20 to about 85, from about 35 to about 100, from about 15 to about 75, or from about 30 to about 80 g/10 min.

Ethylene polymers in accordance with this invention can have a ratio of HLMI/MI in a range from about 40 to about 175, from about 50 to about 175, or from about 50 to about 150. Other suitable ranges for HLMI/MI can include, but are not limited to, from about 60 to about 160, from about 55 to about 140, from about 45 to about 145, or from about 50 to about 130, and the like.

The densities of ethylene-based polymers disclosed herein often are greater than or equal to about 0.945 g/cm³, for example, greater than or equal to about 0.95, or greater than or equal to about 0.955 g/cm³, and often can range up to about 0.968 g/cm³. Yet, in particular aspects, the density can be in a range from about 0.945 to about 0.965, from about 0.95 to about 0.965, from about 0.95 to about 0.962, from about 0.955 to about 0.965, or from about 0.957 to about 0.963 g/cm³.

Generally, polymers in aspects of the present invention have low levels of long chain branching, with typically less than about 0.01 long chain branches (LCB) per 1000 total carbon atoms, and similar in LCB content to polymers shown, for example, in U.S. Pat. Nos. 7,517,939, 8,114,946, and 8,383,754, which are incorporated herein by reference in their entirety. In other aspects, the number of LCB per 1000 total carbon atoms can be less than about 0.008, less than about 0.007, less than about 0.005, or less than about 0.003 LCB per 1000 total carbon atoms.

In certain aspects, the disclosed ethylene polymers can have improved environmental stress crack resistance (ESCR) over comparable polymers (e.g., equivalent density, melt index, molecular weight, etc.) produced using a chromium-based catalyst system. ESCR testing and test results disclosed herein are from ASTM D1693, condition B, either 10% igepal or 100% igepal: the 10% igepal ESCR test is a much more stringent test than ESCR testing conducted using the 100% igepal solution. In some aspects, the ethylene polymers described herein can have an ESCR (using 100% igepal) of at least 400 hours, at least 600 hours, at least 1,000 hours, at least 1,200 hours, at least 1,500 hours, or at least 2,000 hours, and often can range as high as 2,500 to 4,000 hours. The ESCR test is typically stopped after a certain number of hours is reached, and given the long duration of the test, the upper limit of ESCR (in hours) is generally not determined. In other aspects, the ethylene polymers described herein can have an ESCR (using 10% igepal) of at least 100 hours, at least 150 hours, at least 200 hours, at least 250 hours, at least 400 hours, or at least 500 hours, and often can range as high as 1,000 to 2,000 hours.

Ethylene copolymers described herein can, in some aspects, have a non-conventional (flat or reverse) comonomer distribution, generally, the higher molecular weight components of the polymer have equal to or higher comonomer incorporation than the lower molecular weight components. Typically, there is flat or increasing comonomer incorporation with increasing molecular weight. In one aspect, the number of short chain branches (SCB) per 1000 total carbon atoms of the polymer at Mw is greater than or equal to the number at Mn. In another aspect, the number of short chain branches (SCB) per 1000 total carbon atoms of the polymer at Mz is greater than or equal to the number at Mw. In yet another aspect, the number of SCB per 1000 total carbon atoms of the polymer at Mz is greater than or equal to the number at Mn. In still another aspect, the number of short chain branches (SCB) per 1000 total carbon atoms of the polymer at a molecular weight of $10^6$ is greater than or equal to the number at a molecular weight of $10^5$.

In an aspect, ethylene polymers described herein can have a ratio of Mw/Mn, or the polydispersity index, in a range from about 5 to about 18, from about 5 to about 15, from about 5 to about 14, from about 6 to about 18, from about 6 to about 16, or from about 6 to about 15. In another aspect, ethylene polymers described herein can have a Mw/Mn in a range from about 7 to about 18, from about 7 to about 15, from about 8 to about 16, or from about 8 to about 14.

In an aspect, ethylene polymers described herein can have a ratio of Mz/Mw in a range from about 5 to about 12, from about 5.5 to about 12, from about 5.5 to about 11, or from about 6 to about 12. In another aspect, ethylene polymers described herein can have a Mz/Mw in a range from about 6 to about 10, or from about 6.5 to about 9.5.

In an aspect, ethylene polymers described herein can have a weight-average molecular weight (Mw) in a range from about 150,000 to about 375,000, from about 150,000 to about 350,000, from about 150,000 to about 325,000, or from about 150,000 to about 300,000 g/mol. In another aspect, ethylene polymers described herein can have a Mw in a range from about 175,000 to about 425,000, from about 175,000 to about 375,000, from about 175,000 to about 350,000, or from about 175,000 to about 300,000 g/mol.

In an aspect, ethylene polymers described herein can have a number-average molecular weight (Mn) in a range from about 10,000 to about 40,000, from about 12,000 to about 40,000, or from about 15,000 to about 40,000 g/mol. In another aspect, ethylene polymers described herein can have a Mn in a range from about 12,000 to about 45,000, from about 12,000 to about 35,000, from about 15,000 to about 35,000, from about 15,000 to about 30,000, or from about 18,000 to about 25,000 g/mol.

In an aspect, ethylene polymers described herein can have a z-average molecular weight (Mz) in a range from about 800,000 to about 4,000,000, from about 900,000 to about 4,000,000, or from about 1,000,000 to about 4,000,000 g/mol. In another aspect, ethylene polymers described herein can have a Mz in a range from about 900,000 to about 3,500,000, from about 1,000,000 to about 3,500,000, from about 1,000,000 to about 3,000,000, or from about 900,000 to about 2,500,000 g/mol.

In an aspect, ethylene polymers described herein can have a CY-a parameter at 190° C. in a range from about 0.02 to about 0.3, from about 0.04 to about 0.2, from about 0.04 to about 0.18, from about 0.06 to about 0.3, or from about 0.06 to about 0.18. The CY-a parameter was determined at 190° C. using the using the Carreau-Yasuda model with creep adjustment, as described herein. In some aspects, ethylene polymers described herein can have a zero-shear viscosity at 190° C. of greater than or equal to about $1 \times 10^5$, greater than or equal to about $2 \times 10^5$, in a range from about $1 \times 10^5$ to about $1 \times 10^7$, or in a range from about $2 \times 10^5$ to about $1 \times 10^7$ Pa-sec. In these and other aspects, ethylene polymers described herein can have a zero-shear viscosity of greater than or equal to about $1 \times 10^6$, greater than or equal to about $2 \times 10^6$, in a range from about $1 \times 10^6$ to about $1 \times 10^{14}$, or in a range from about $2 \times 10^6$ to about $1 \times 10^{12}$ Pa-sec, using the Carreau Yasuda model with creep adjustment. While not wishing to be bound by theory, applicants believe that a higher zero-shear viscosity may correlate with a higher polymer melt strength (e.g., better melt strength and processability in blow molding).

Unexpectedly, Applicants determined that the die swell of an ethylene polymer, for example, in a blow molding process, correlates with a rheological slope parameter, i.e., the slope of a plot of the viscosity (Pa-sec) versus shear rate ($sec^{-1}$) at 100 $sec^{-1}$ for the ethylene polymer at 190° C. In an aspect, the ethylene polymer can have a slope of a plot of the viscosity (Pa-sec) versus shear rate ($sec^{-1}$) at 100 $sec^{-1}$ and 190° C. (the rheological slope parameter) in a range from about 0.42 to about 0.65, such as, for example, from about 0.42 to about 0.6, from about 0.42 to about 0.55, from about 0.44 to about 0.65, from about 0.44 to about 0.55, from about 0.42 to about 0.5, from about 0.44 to about 0.5, from about 0.45 to about 0.6, or from about 0.45 to about 0.5. The rheological slope parameter is determined from the viscosity data measured at 190° C.

Generally, ethylene polymers consistent with certain aspects of the invention often can have a bimodal molecular weight distribution (as determined using gel permeation chromatography (GPC) or other suitable analytical technique). Often, in a bimodal molecular weight distribution, there is a valley between the peaks, and the peaks can be separated or deconvoluted. Typically, a bimodal molecular weight distribution can be characterized as having an identifiable high molecular weight component (or distribution) and an identifiable low molecular weight component (or distribution). Illustrative unimodal MWD curves and bimodal MWD curves are shown in U.S. Pat. No. 8,383,754, incorporated herein by reference in its entirety.

In an aspect, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

As described herein, ethylene polymers (e.g., ethylene/α-olefin copolymers) can have a lower molecular weight component and a higher molecular weight component. The molecular weight characteristics and relative amounts of these lower and higher molecular weight components are determined by deconvoluting the composite (overall polymer) molecular weight distribution (e.g., determined using gel permeation chromatography). The amount of the higher molecular weight component, based on the weight of the total polymer, is not limited to any particular range. Generally, however, the amount of the higher molecular weight component can less than or equal to about 35%, less than or equal to about 30%, less than or equal to about 25%, less than or equal to about 22%, or less than or equal to about 20%. Suitable non-limiting ranges for the amount of the higher molecular weight component, based on the weight of the total polymer, include from about 5 to about 30%, from about 6 to about 35%, from about 4 to about 25%, from about 5 to about 22%, from about 5 to about 20%, from about 5 to about 18%, from about 6 to about 25%, from about 6 to about 22%, from about 6 to about 20%, or from about 6 to about 18%.

In accordance with aspects of this invention, the higher molecular weight component can have a Mp in a range from about 650,000 to about 1,100,000, from about 700,000 to about 1,100,000, from about 650,000 to about 1,000,000, from about 700,000 to about 1,000,000, or from about 725,000 to about 975,000 g/mol. Additionally or alternatively, the higher molecular weight component can have a Mw in a range from about 825,000 to about 1,500,000, from about 825,000 to about 1,300,000, from about 850,000 to about 1,350,000, or from about 850,000 to about 1,250,000 g/mol. Additionally or alternatively, the higher molecular weight component can have a Mn in a range from about 175,000 to about 700,000, from about 175,000 to about 600,000, from about 200,000 to about 650,000, from about 200,000 to about 600,000, or from about 225,000 to about 600,000 g/mol. Additionally or alternatively, the higher molecular weight component can have a ratio of Mz/Mw of less than or equal to about 2.5, less than or equal to about 2.2, in a range from about 1.5 to about 2.5, or in a range from about 1.5 to about 2.2.

In accordance with aspects of this invention, the lower molecular weight component can have a Mp in a range from about 40,000 to about 75,000, from about 45,000 to about 80,000, from about 45,000 to about 75,000, from about 45,000 to about 70,000, or from about 40,000 to about 80,000 g/mol. Additionally or alternatively, the lower molecular weight component can have a Mw in a range from about 45,000 to about 85,000, from about 45,000 to about 80,000, from about 50,000 to about 80,000, or from about 55,000 to about 80,000 g/mol. Additionally or alternatively, the lower molecular weight component can have a Mn in a range from about 8,000 to about 35,000, from about 10,000 to about 35,000, from about 10,000 to about 30,000, or from about 12,000 to about 25,000 g/mol. Additionally or alternatively, the lower molecular weight component can have a ratio of Mz/Mw of less than or equal to about 2.8, less than or equal to about 2.5, in a range from about 1.5 to about 2.8, in a range from about 1.6 to about 2.5, in a range from about 1.6 to about 2.4, or in a range from about 1.6 to about 2.2.

In accordance with some aspects of this invention, the ethylene polymer is not peroxide treated or modified, and certain representative polymer properties are disclosed hereinabove. In other aspects of this invention, the ethylene polymer has been peroxide treated or modified from a base resin, and the peroxide treated ethylene polymer and/or the base resin has the representative polymer properties disclosed hereinabove. In these aspects, the ethylene polymer can be produced from a base resin via a process comprising contacting the base resin with a peroxide compound at a temperature sufficient to generate peroxide groups at about 10 to about 400 ppm of peroxide groups based on the weight of the base resin. In some aspects, the amount of peroxide groups in the peroxide compound, based on the weight of the base resin, can be in a range from about 10 to about 300 ppm, from about 10 to about 250 ppm, from about 10 to about 100 ppm, from about 10 to about 50 ppm, from about 15 to about 350 ppm, from about 15 to about 250 ppm, or from about 20 to about 150 ppm.

The peroxide compound can be any compound containing one or more peroxide (O—O) groups, suitable examples of which can include, but are not limited to, 2,5-dimethyl-2,5-di(t-butylperoxy)hexane, dicumyl peroxide, t-butyl cumyl peroxide, n-butyl-4,4'-di(t-butylperoxy)valerate, and the like.

In an aspect, the step of contacting the base resin with the peroxide compound can comprise melt processing a blend (or mixture) of the base resin and the peroxide compound at any suitable melt processing temperature, such as, for example, a temperature in a range from about 120 to about 300° C., a temperature in a range from about 150 to about 250° C., a temperature in a range from about 175 to about 225° C., and so forth. The appropriate temperature may depend upon the composition of the peroxide compound and the temperature at which it generates peroxide groups. Prior to contacting the peroxide compound, the base resin can be in any suitable form including, for example, fluff, powder, granulate, pellet, solution, slurry, emulsion, and the like. Similarly, the peroxide compound can be in solid form, in solution, or in a slurry. One particular method uses a resin-based masterbatch of the peroxide compound, and contacts the base resin after it has been melted.

The present invention is not limited to any particular method of contacting and melt processing the base resin and the peroxide compound. Various methods of mixing and/or compounding can be employed, as would be recognized by those of skill in the art. In one aspect, the melt processing of the base resin and the peroxide compound can be performed in a twin screw extrusion system. In another aspect, the melt processing of the base resin and the peroxide compound can be performed in a single screw extrusion system.

As described herein, certain properties of the ethylene polymer before and after peroxide treatment can be generally in the same ranges. In contrast, increasing levels of peroxide addition during peroxide treatment typically increases the zero-shear viscosity and the relaxation time, and decreases the CY-a parameter, ESCR, and the rheological slope parameter. Hence, peroxide treatment can be used to modify certain properties of the base ethylene polymer, if desired, to better match the processing characteristics of chromium-based resins (e.g., zero-shear viscosity, die swell, etc.).

Articles and Products

Articles of manufacture can be formed from, and/or can comprise, the ethylene polymers of this invention and, accordingly, are encompassed herein. For example, articles which can comprise ethylene polymers of this invention can include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein, and the article of manufacture can be a blow molded article.

Applicants also contemplate a method for forming or preparing an article of manufacture comprising any ethylene polymer disclosed herein. For instance, a method can comprise (i) contacting a catalyst composition with ethylene and an optional olefin comonomer under polymerization conditions in a polymerization reactor system to produce an ethylene polymer, wherein the catalyst composition can comprise catalyst component I, catalyst component II, an activator (e.g., an activator-support comprising a solid oxide treated with an electron-withdrawing anion), and an optional co-catalyst (e.g., an organoaluminum compound); and (ii) forming an article of manufacture comprising the ethylene polymer. The forming step can comprise blending, melt processing, extruding, molding (e.g., blow molding), or thermoforming, and the like, including combinations thereof.

Catalyst Systems and Polymerization Processes

In accordance with some aspects of the present invention, the ethylene polymer (and/or the base resin) can be produced using a Ziegler-Natta catalyst system. In accordance with other aspects of the present invention, the ethylene polymer (and/or the base resin) can be produced using a metallocene-based catalyst system. In accordance with further aspects of the present invention, the ethylene polymer (and/or the base resin) can be produced using a dual metallocene-based catalyst system. In these aspects, catalyst component I can comprise an unbridged metallocene compound, for instance, an unbridged zirconium or hafnium based metallocene compound containing two cyclopentadienyl groups, two indenyl groups, or a cyclopentadienyl and an indenyl group. Catalyst component II can comprise a bridged metallocene compound, for instance, a bridged zirconium or hafnium based metallocene compound with a cyclopentadienyl group and a fluorenyl group, and with an alkenyl substituent on the bridging group and/or on the cyclopentadienyl group.

Generally, catalyst component I can comprise an unbridged zirconium or hafnium based metallocene compound and/or an unbridged zirconium and/or hafnium based dinuclear metallocene compound. In one aspect, for instance, catalyst component I can comprise an unbridged zirconium or hafnium based metallocene compound containing two cyclopentadienyl groups, two indenyl groups, or a cyclopentadienyl and an indenyl group. In another aspect, catalyst component I can comprise an unbridged zirconium or hafnium based metallocene compound containing two cyclopentadienyl groups. In yet another aspect, catalyst component I can comprise an unbridged zirconium or hafnium based metallocene compound containing two indenyl groups. In still another aspect, catalyst component I can comprise an unbridged zirconium or hafnium based metallocene compound containing a cyclopentadienyl and an indenyl group.

In some aspects, catalyst component I can comprise an unbridged zirconium based metallocene compound containing two cyclopentadienyl groups, two indenyl groups, or a cyclopentadienyl and an indenyl group, while in other aspects, catalyst component I can comprise a dinuclear unbridged metallocene compound with an alkenyl linking group.

Catalyst component I can comprise, in particular aspects of this invention, an unbridged metallocene compound having formula (I):

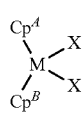
(I)

Within formula (I), M, $Cp^A$, $Cp^B$, and each X are independent elements of the unbridged metallocene compound. Accordingly, the unbridged metallocene compound having formula (I) can be described using any combination of M, $Cp^A$, $Cp^B$, and X disclosed herein.

Unless otherwise specified, formula (I) above, any other structural formulas disclosed herein, and any metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

In accordance with aspects of this invention, the metal in formula (I), M, can be Ti, Zr, or Hf. In one aspect, for instance, M can be Zr or Hf, while in another aspect, M can be Ti; alternatively, M can be Zr; or alternatively, M can be Hf.

Each X in formula (I) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $-OBR^1_2$, or $-OSO_2R^1$, wherein $R^1$ is a $C_1$ to $C_{36}$ hydrocarbyl group. It is contemplated that each X can be either the same or a different monoanionic ligand.

In one aspect, each X independently can be H, $BH_4$, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, each X independently can be H, $BH_4$, a halide, $OBR^1_2$, or $OSO_2R^1$, wherein $R^1$ is a $C_1$ to $C_{18}$ hydrocarbyl group. In another aspect, each X independently can be H, $BH_4$, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR^1_2$, or $OSO_2R^1$, wherein $R^1$ is a $C_1$ to $C_{12}$ hydrocarbyl group. In another aspect, each X independently can be H, $BH_4$, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR^1_2$, or $OSO_2R^1$, wherein $R^1$ is a $C_1$ to $C_{10}$ hydrocarbyl group. In yet another aspect, each X independently can be H, $BH_4$, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR^1_2$, or $OSO_2R^1$, wherein $R^1$ is a $C_1$ to $C_8$ hydrocarbyl group. In still another aspect, each X independently can be a halide or a $C_1$ to $C_{18}$ hydrocarbyl group. For example, each X can be Cl.

In one aspect, each X independently can be H, $BH_4$, a halide, or a $C_1$ to $C_{36}$ hydrocarbyl group, hydrocarboxy group, hydrocarbylaminyl group, hydrocarbylsilyl group, or hydrocarbylaminylsilyl group, while in another aspect, each X independently can be H, $BH_4$, or a $C_1$ to $C_{18}$ hydrocarboxy group, hydrocarbylaminyl group, hydrocarbylsilyl group, or hydrocarbylaminylsilyl group. In yet another aspect, each X independently can be a halide; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group. In still another aspect, each X can be H; alternatively, F; alternatively, Cl; alternatively, Br; alternatively, I; alternatively, $BH_4$; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group.

Each X independently can be, in some aspects, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a $C_1$ to $C_{36}$, a $C_1$ to $C_{18}$, a $C_1$ to $C_{12}$, or a $C_1$ to $C_8$ alkoxy, aryloxy, alkylaminyl, dialkylaminyl, trihydrocarbylsilyl, and hydrocarbylaminylsilyl.

Moreover, each X independently can be, in certain aspects, a halide or a $C_1$ to $C_{18}$ hydrocarbyl group; alternatively, a halide or a $C_1$ to $C_8$ hydrocarbyl group; alternatively, F, Cl, Br, I, methyl, benzyl, or phenyl; alternatively, Cl, methyl, benzyl, or phenyl; alternatively, a $C_1$ to $C_{18}$ alkoxy, aryloxy, alkylaminyl, dialkylaminyl, trihydrocarbylsilyl, or hydrocarbylaminylsilyl group; alternatively, a $C_1$ to $C_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (I), $Cp^A$ and $Cp^B$ independently can be a substituted or unsubstituted cyclopentadienyl or indenyl group. In one aspect, $Cp^A$ and $Cp^B$ independently can be an unsubstituted cyclopentadienyl or indenyl group. Alternatively, $Cp^A$ and $Cp^B$ independently can be a substituted indenyl or cyclopentadienyl group, for example, having up to 5 substituents.

If present, each substituent on $Cp^A$ and $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on $Cp^A$ and/or $Cp^B$ can be either the same or a different substituent group. Moreover, each substituent can be at any position on the respective cyclopentadienyl or indenyl ring structure that conforms with the rules of chemical valence. In an aspect, the number of substituents on $Cp^A$ and/or on $Cp^B$ and/or the positions of each substituent on $Cp^A$ and/or on $Cp^B$ are independent of each other. For instance, two or more substituents on $Cp^A$ can be different, or alternatively, each substituent on $Cp^A$ can be the same. Additionally or alternatively, two or more substituents on $Cp^B$ can be different, or alternatively, all substituents on $Cp^B$ can be the same. In another aspect, one or more of the substituents on $Cp^A$ can be different from the one or more of the substituents on $Cp^B$, or alternatively, all substituents on both $Cp^A$ and/or on $Cp^B$ can be the same. In these and other aspects, each substituent can be at any position on the respective cyclopentadienyl or indenyl ring structure. If substituted, $Cp^A$ and/or $Cp^B$ independently can have one substituent, two substituents, three substituents, four substituents, and so forth.

In formula (I), each substituent on $Cp^A$ and/or on $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. In some aspects, each substituent independently can be H; alternatively, a halide; alternatively, a $C_1$ to $C_{18}$ hydrocarbyl group; alternatively, a $C_1$ to $C_{18}$ halogenated hydrocarbyl group; alternatively, a $C_1$ to $C_{18}$ hydrocarboxy group; alternatively, a $C_1$ to $C_{18}$ hydrocarbylsilyl group; alternatively, a $C_1$ to $C_{12}$ hydrocarbyl group or a $C_1$ to $C_{12}$ hydrocarbylsilyl group; or alternatively, a $C_1$ to $C_8$ alkyl group or a $C_3$ to $C_8$ alkenyl group. The halide, $C_1$ to $C_{36}$ hydrocarbyl group, $C_1$ to $C_{36}$ hydrocarboxy group, and $C_1$ to $C_{36}$ hydrocarbylsilyl group which can be a substituent on $Cp^A$ and/or on $Cp^B$ in formula (I) can be any halide, $C_1$ to $C_{36}$ hydrocarbyl group, $C_1$ to $C_{36}$ hydrocarboxy group, and $C_1$ to $C_{36}$ hydrocarbylsilyl group described herein (e.g., as pertaining to X in formula (I)). A substituent on $Cp^A$ and/or on $Cp^B$ in formula (I) can be, in certain aspects, a $C_1$ to $C_{36}$ halogenated hydrocarbyl group, where the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

As a non-limiting example, if present, each substituent on $Cp^A$ and/or $Cp^B$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group (or other substituted aryl group), a benzyl group, a naphthyl group, a trimethylsilyl group, a triisopropylsilyl group, a triphenylsilyl group, or an allyldimethylsilyl group; alternatively, H; alternatively, Cl; alternatively, $CF_3$; alternatively, a methyl group; alternatively, an ethyl group; alternatively, a propyl group; alternatively, a butyl group; alternatively, a pentyl group; alternatively, a hexyl group; alternatively, a heptyl group; alternatively, an octyl group, a nonyl group; alternatively, a decyl group; alternatively, an ethenyl group; alternatively, a propenyl group; alternatively, a butenyl group; alternatively, a pentenyl group; alternatively, a hexenyl group; alternatively, a heptenyl group; alternatively, an octenyl group; alternatively, a nonenyl group; alternatively, a decenyl group; alternatively, a phenyl group; alternatively, a tolyl group; alternatively, a benzyl group; alternatively, a naphthyl group; alternatively, a trimethylsilyl group; alternatively, a triisopropylsilyl group; alternatively, a triphenylsilyl group; or alternatively, an allyldimethylsilyl group.

Illustrative and non-limiting examples of unbridged metallocene compounds having formula (I) and/or suitable for use as catalyst component I can include the following compounds (Ph=phenyl):

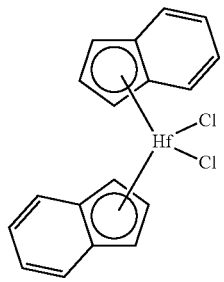

(1)

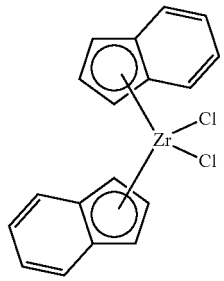

(2)

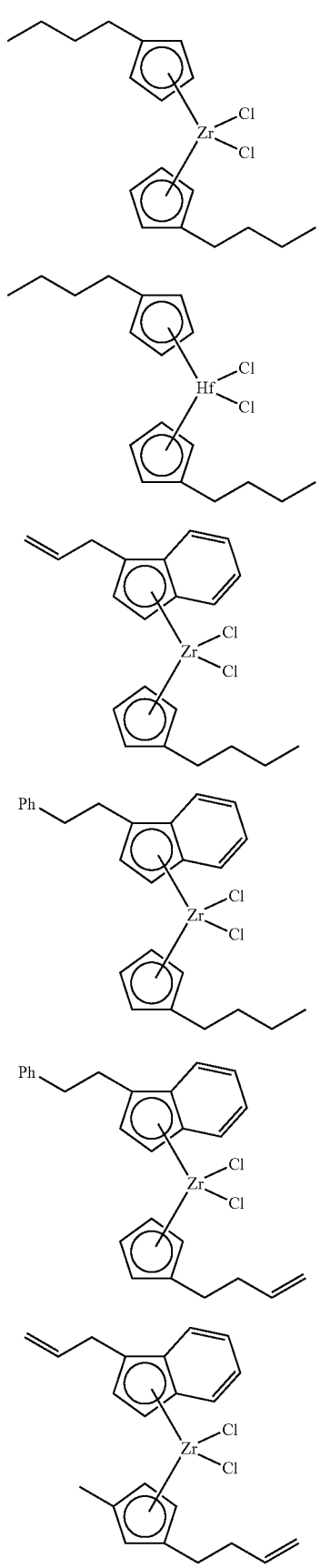

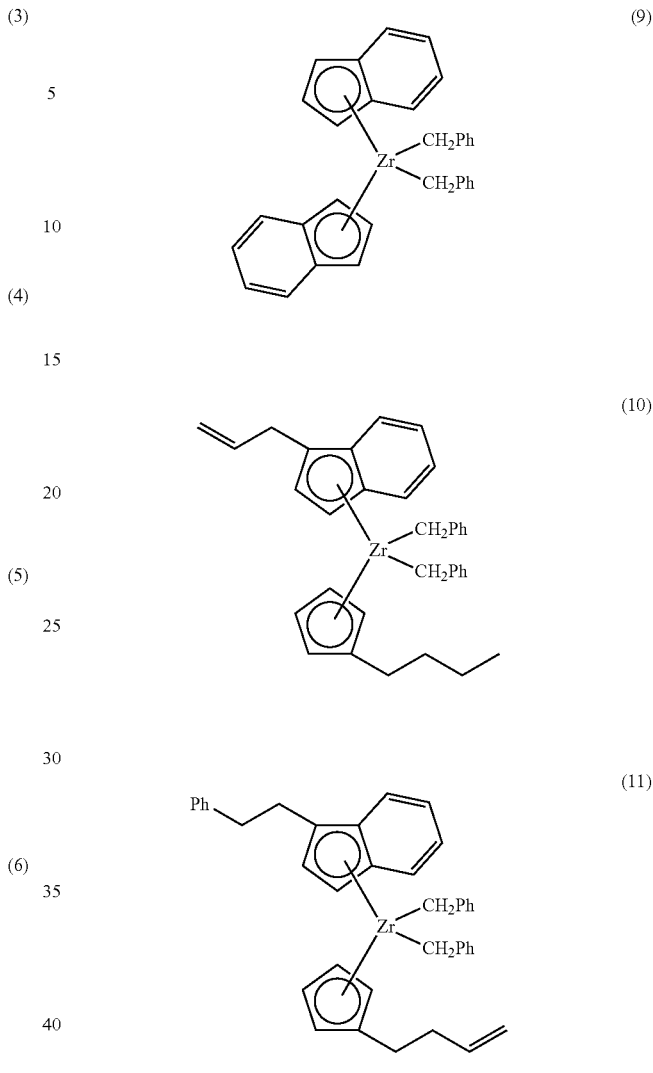

and the like, as well as combinations thereof

Catalyst component I is not limited solely to unbridged metallocene compounds such as described above, or to suitable unbridged metallocene compounds disclosed in U.S. Pat. Nos. 7,199,073, 7,226,886, 7,312,283, and 7,619,047, which are incorporated herein by reference in their entirety. For example, catalyst component I can comprise an unbridged zirconium and/or hafnium based dinuclear metallocene compound. In one aspect, catalyst component I can comprise an unbridged zirconium based homodinuclear metallocene compound. In another aspect, catalyst component I can comprise an unbridged hafnium based homodinuclear metallocene compound. In yet another aspect, catalyst component I can comprise an unbridged zirconium and/or hafnium based heterodinuclear metallocene compound (i.e., dinuclear compound with two hafniums, or two zirconiums, or one zirconium and one hafnium). Catalyst component I can comprise unbridged dinuclear metallocenes such as those described in U.S. Pat. Nos. 7,919,639 and 8,080,681, the disclosures of which are incorporated herein by reference in their entirety. Illustrative and non-limiting examples of dinuclear metallocene compounds suitable for use as catalyst component I can include the following compounds:

(12)

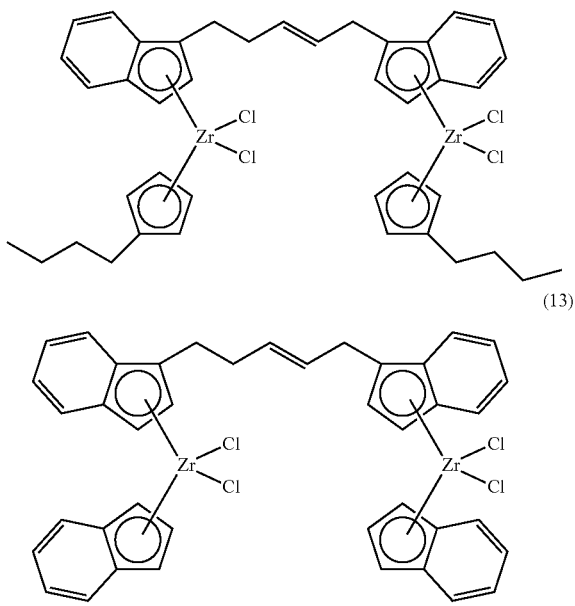

(13)

and the like, as well as combinations thereof.

Generally, catalyst component II can comprise a bridged metallocene compound. In one aspect, for instance, catalyst component II can comprise a bridged zirconium or hafnium based metallocene compound. In another aspect, catalyst component II can comprise a bridged zirconium or hafnium based metallocene compound with an alkenyl substituent. In yet another aspect, catalyst component II can comprise a bridged zirconium or hafnium based metallocene compound with an alkenyl substituent and a fluorenyl group. In still another aspect, catalyst component II can comprise a bridged zirconium or hafnium based metallocene compound with a cyclopentadienyl group and a fluorenyl group, and with an alkenyl substituent on the bridging group and/or on the cyclopentadienyl group.

In some aspects, catalyst component II can comprise a bridged metallocene compound having an aryl group substituent on the bridging group, while in other aspects, catalyst component II can comprise a dinuclear bridged metallocene compound with an alkenyl linking group.

Catalyst component II can comprise, in particular aspects of this invention, a bridged metallocene compound having formula (II):

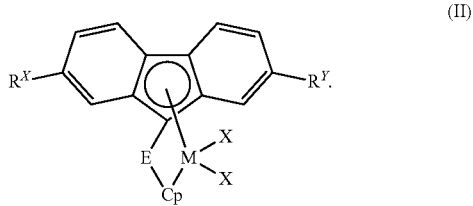

(II)

Within formula (II), M, Cp, $R^X$, $R^Y$, E, and each X are independent elements of the bridged metallocene compound. Accordingly, the bridged metallocene compound having formula (II) can be described using any combination of M, Cp, $R^X$, $R^Y$, E, and X disclosed herein.

The selections for M and each X in formula (II) are the same as those described herein above for formula (I). In formula (II), Cp can be a substituted cyclopentadienyl, indenyl, or fluorenyl group. In one aspect, Cp can be a substituted cyclopentadienyl group, while in another aspect, Cp can be a substituted indenyl group.

In some aspects, Cp can contain no additional substituents, e.g., other than bridging group E, discussed further herein below. In other aspects, Cp can be further substituted with one substituent, two substituents, three substituents, four substituents, and so forth. If present, each substituent on Cp independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp can be either the same or a different substituent group. Moreover, each substituent can be at any position on the respective cyclopentadienyl, indenyl, or fluorenyl ring structure that conforms with the rules of chemical valence. In general, any substituent on Cp, independently, can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein (e.g., as pertaining to substituents on $Cp^A$ and $Cp^B$ in formula (I)).

In one aspect, for example, each substituent on Cp independently can be a $C_1$ to $C_{12}$ hydrocarbyl group or a $C_1$ to $C_{12}$ hydrocarbylsilyl group. In another aspect, each substituent on Cp independently can be a $C_1$ to $C_8$ alkyl group or a $C_3$ to $C_8$ alkenyl group. In yet another aspect, each substituent on $Cp^C$ independently can be H, Cl, $CF_3$, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group.

Similarly, $R^X$ and $R^Y$ in formula (II) independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to substituents on $Cp^A$ and $Cp^B$ in formula (I)). In one aspect, for example, $R^X$ and $R^Y$ independently can be H or a $C_1$ to $C_{12}$ hydrocarbyl group. In another aspect, $R^X$ and $R^Y$ independently can be a $C_1$ to $C_{10}$ hydrocarbyl group. In yet another aspect, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group E in formula (II) can be (i) a bridging group having the formula >$E^A R^A R^B$, wherein $E^A$ can be C, Si, or Ge, and $R^A$ and $R^B$ independently can be H or a $C_1$ to $C_{18}$ hydrocarbyl group; (ii) a bridging group having the formula —$CR^CR^D$—$CR^ER^F$—, wherein $R^C$, $R^D$, $R^E$, and $R^E$ independently can be H or a $C_1$ to $C_{18}$ hydrocarbyl group; or (iii) a bridging group having the formula —$SiR^GR^H$-$E^5R^IR^J$—, wherein $E^5$ can be C or Si, and $R^G$, $R^H$, $R^I$, and $R^J$ independently can be H or a $C_1$ to $C_{18}$ hydrocarbyl group.

In the first option, the bridging group E can have the formula $>E^A R^A R^B$, wherein $E^A$ can be C, Si, or Ge, and $R^A$ and $R^B$ independently can be H or any $C_1$ to $C_{18}$ hydrocarbyl group disclosed herein. In some aspects of this invention, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In these and other aspects, $R^A$ and $R^B$ can be either the same or different.

In the second option, the bridging group E can have the formula $-CR^C R^D-CR^E R^F-$, wherein $R^C$, $R^D$, $R^E$, and $R^E$ independently can be H or any $C_1$ to $C_{18}$ hydrocarbyl group disclosed herein. For instance, $R^C$, $R^D$, $R^E$, and $R^E$ independently can be H or a methyl group.

In the third option, the bridging group E can have the formula $-SiR^G R^H-E^5 R^I R^J-$, wherein $E^5$ can be C or Si, and $R^G$, $R^H$, $R^I$, and $R^J$ independently can be H or any $C_1$ to $C_{18}$ hydrocarbyl group disclosed herein. For instance, $E^5$ can be Si, and $R^G$, $R^H$, $R^I$, and $R^J$ independently can be H or a methyl group.

Illustrative and non-limiting examples of bridged metallocene compounds having formula (II) and/or suitable for use as catalyst component II can include the following compounds (Me=methyl, Ph=phenyl; t-Bu=tert-butyl):

(14)

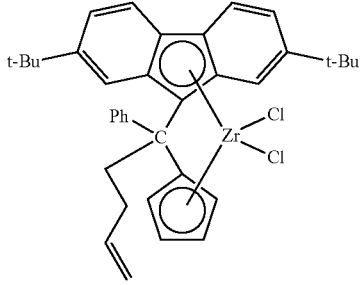

(15)

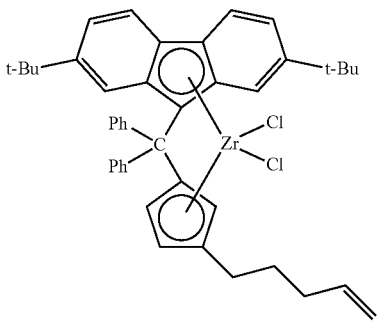

-continued (16)

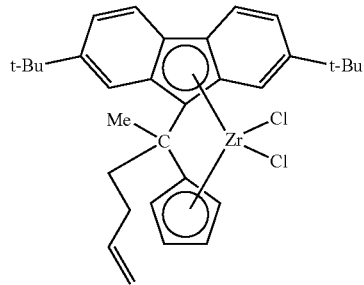

(17)

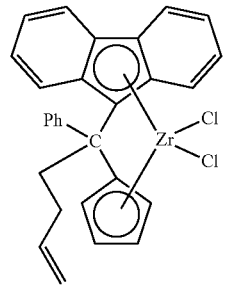

(18)

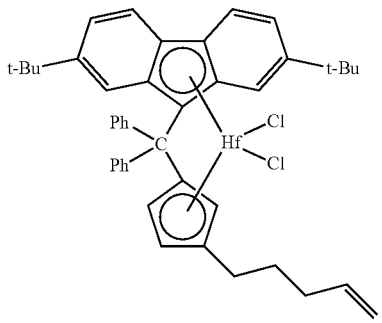

(19)

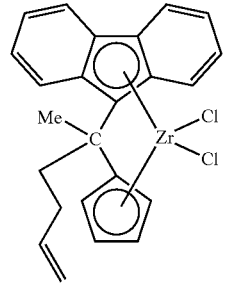

(20)

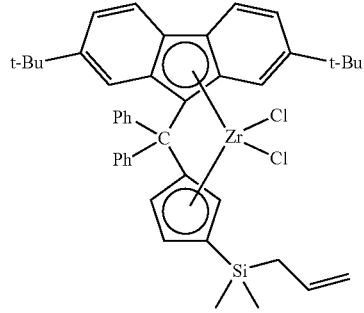

-continued
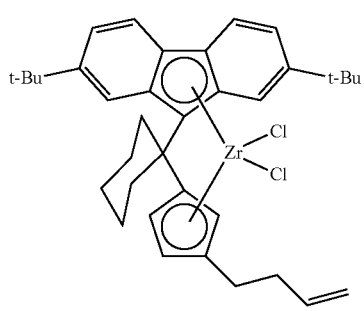
(21)
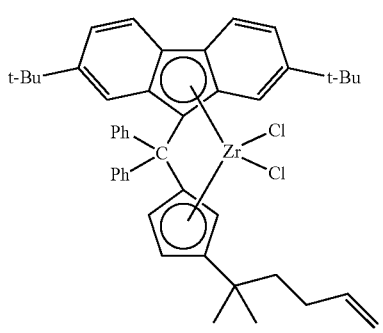
(22)
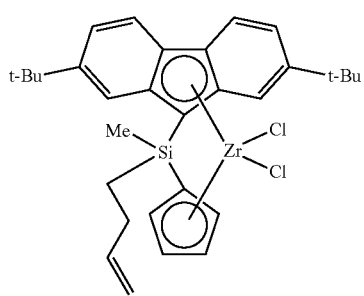
(23)
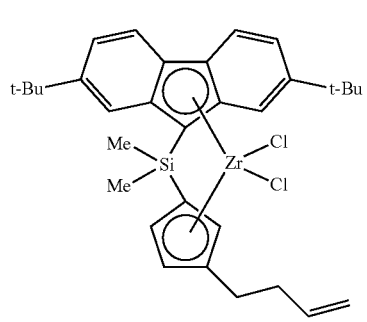
(24)
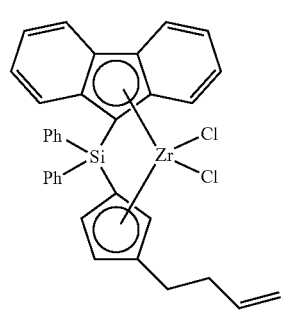
(25)
and the like, as well as combinations thereof
Further examples of bridged metallocene compounds having formula (II) and/or suitable for use as catalyst component II can include, but are not limited to, the following compounds:
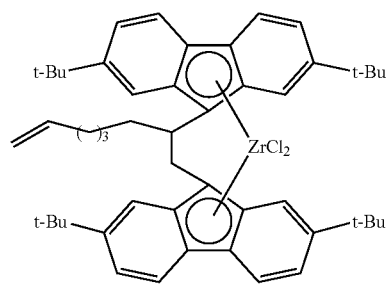
(26)
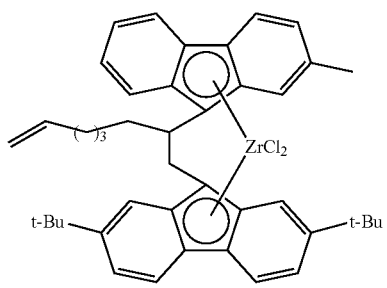
(27)
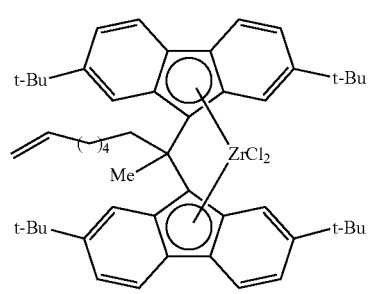
(28)

-continued (29)

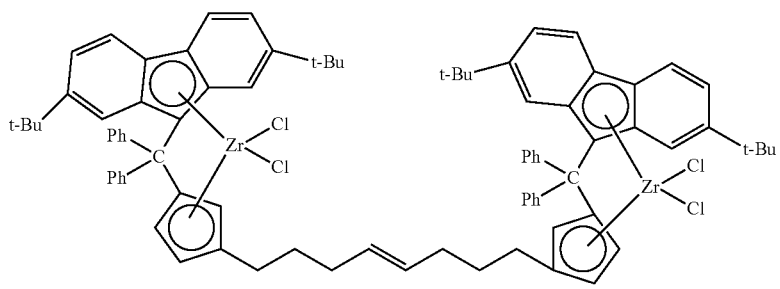

and the like, as well as combinations thereof

Catalyst component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517, 939, and 7,619,047, which are incorporated herein by reference in their entirety.

According to an aspect of this invention, the weight ratio of catalyst component I to catalyst component II in the catalyst composition can be in a range from about 10:1 to about 1:10, from about 8:1 to about 1:8, from about 5:1 to about 1:5, from about 4:1 to about 1:4, from about 3:1 to about 1:3; from about 2:1 to about 1:2, from about 1.5:1 to about 1:1.5, from about 1.25:1 to about 1:1.25, or from about 1.1:1 to about 1:1.1.

Typically, the dual metallocene-based catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, and 8,623,973, which are incorporated herein by reference in their entirety. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide.

The present invention can employ catalyst compositions containing catalyst component I, catalyst component II, an activator (one or more than one), and optionally, a co-catalyst.

When present, the co-catalyst can include, but is not limited to, metal alkyl, or organometal, co-catalysts, with the metal encompassing boron, aluminum, and the like. Optionally, the catalyst systems provided herein can comprise a co-catalyst, or a combination of co-catalysts. For instance, alkyl boron and/or alkyl aluminum compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof.

The ethylene polymers (and/or base resins) can be produced using any suitable olefin polymerization process using various types of polymerization reactors, polymerization reactor systems, and polymerization reaction conditions. As used herein, "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, load-out, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of ethylene polymer. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor. In some reactor systems, the polymerization temperature generally can be within a range from about 70° C. to about 90° C., or from about 75° C. to about 85° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Polymer density was determined in grams per cubic centimeter (g/cm$^3$) on a compression molded sample, cooled at about 15° C. per hour, and conditioned for about 40 hours at room temperature in accordance with ASTM D1505 and ASTM D4703. ESCR was determined in accordance with ASTM D1693, condition B, with 10% igepal or 100% igepal.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 µL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, Mv is the viscosity-average molecular weight, and Mp is the peak molecular weight (location, in molecular weight, of the highest point of each component of the molecular weight distribution curve).

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta*(\omega)| = \frac{\eta_0}{[1+(\tau_\eta \omega)^a]^{(1-n)/a}},$$

wherein:
|η*(ω)|=magnitude of complex shear viscosity;
$\eta_0$=zero shear viscosity;
$\tau_\eta$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

A creep adjustment was used to extend the low frequency range of rheological characterization to 10$^{-4}$ sec$^{-1}$. In the creep test, a constant shear stress $\sigma_0$ was applied to the specimen and the shear strain γ was recorded as a function of creep time t. Although the time-dependent data generated by the creep and creep recovery tests look different from the frequency-dependent data measured in the dynamic frequency sweep test, as long as the measurements are performed in the linear viscoelastic regime, these two experimental data sets contain the same rheological information, so that the time-dependent creep compliance data can be transformed into the frequency-dependent dynamic data, and thus the long time creep measurement can supplement the low frequency data of the dynamic frequency sweep measurement.

The generalized Voigt model was used for modeling the time-dependent creep compliance $J(t)=\gamma(t)/\sigma_0$ in terms of a discrete spectrum $J_k$ of retardation times $\tau_k$ and zero shear rate viscosity $\eta_0$, $$J(t) = \sum_{k=1}^{N} J_k(1-e^{-t/\tau_k}) + \frac{t}{\eta_0}.$$

If the discrete retardation spectrum accurately describes the compliance data, the theory of linear viscoelasticity permits a quantitative description of other types of experimental data, for example, the storage and the loss compliance calculated as $$J'(\omega) = \sum_{k=1}^{N} J_k \frac{1}{1+\omega^2\tau_k^2}, \quad J''(\omega) = \frac{1}{\omega\eta_0} + \sum_{k=1}^{N} J_k \frac{\omega\tau_k}{1+\omega^2\tau_k^2}.$$

From the relationship between the complex modulus and the complex compliance, the storage and loss modulus of dynamic frequency sweep data can be obtained as $$G'(\omega) = \frac{J'(\omega)}{[J'(\omega)]^2 + [J''(\omega)]^2}, \quad G''(\omega) = \frac{J''(\omega)}{[J'(\omega)]^2 + [J''(\omega)]^2}.$$

As a simple numerical approach to obtain the discrete spectrum of retardation times, the Microsoft Excel Solver tool can be used by minimizing the following objective function O.

$$O = \sum_{i=1}^{N} \frac{[J_{exp}(t_i) - J_{model}(t_i)]^2}{[J_{exp}(t_i)]^2}.$$

For reliable conversion of the time-dependent creep data into the frequency-dependent dynamic data, the frequency range needs to be limited by the testing time of the creep measurement. If it is possible to obtain precise experimental data over the entire range of creep time until the creep compliance reaches the steady state, the exact function of retardation spectra over the entire range of time scale also can be calculated. However, it is often not practical to obtain such data for high molecular weight polymers, which have very long relaxation times. The creep data only contain information within a limited range of time, so that the frequency range is limited by the duration time $t_N$ of the creep test, i.e., valid information for frequencies is in the range of ω>$t_N^{-1}$, and the extrapolated data outside this frequency range can be influenced by artifacts of the fittings.

For the rheological measurements involving a creep adjustment, the polymer samples were compression molded at 182° C. for a total of 3 min. The samples were allowed to melt at a relatively low pressure for 1 min and then subjected to a high molding pressure for an additional 2 min. The molded samples were then quenched in a room temperature press, and then 25.4 mm diameter disks were stamped out of the molded slabs for the measurement in the rotational rheometer. The measurements were performed in parallel plates of 25 mm diameter at 190° C. using a controlled-stress rheometer equipped with an air bearing system (Physica MCR-500, Anton Paar). The test chamber of the rheometer was purged with nitrogen to minimize oxidative degradation. After thermal equilibration, the specimens were squeezed between the plates to a 1.6 mm thickness, and the excess was trimmed. A total of 8 min elapsed between the time the sample was inserted and the time the test was started. For the dynamic frequency sweep measurement, small-strain (1~10%) oscillatory shear in the linear viscoelastic regime was applied at angular frequencies from 0.0316 to 316 $\sec^{-1}$. The creep test was performed for 10,200 sec (170 min) to limit the overall testing time within 4 hr, since sample throughput and thermal stability were concerns. By converting the time dependent creep data to frequency dependent dynamic data, the low frequency range was extended down to $10^{-4}$ rad/sec, two orders of magnitude lower than the frequency range of the dynamic test. The complex viscosity ($|\eta^*|$) versus frequency ($\omega$) data were curve fitted using the Carreau-Yasuda model.

One of the major concerns in performing the creep test, and indeed any long time scale measurement, was that the sample does not appreciably change during the measurement, which may take several hours to perform. If a polymer sample is heated for long time period without proper thermal stabilization (e.g., antioxidants), changes in the polymer can occur that can have a significant effect on the rheological behavior of the polymer and its characterization. Polymers which are being tested should have thermal stability for at least 4-5 hr at 190° C. under nitrogen; for example, ethylene polymers containing at least 0.4 wt. % of antioxidants were found to be stable enough to obtain valid creep adjustment data.

For the rheological measurement in the parallel plates, the specimen was squeezed between the plates to a 1.6 mm thickness, and then the excess was trimmed. When the sample was trimmed with large forces on one direction, some residual stress was generated to cause the strain to drift. Therefore, performing the creep test right after sample trimming should be avoided, because the residual stress can affect the subsequent creep measurement, particularly for the highly viscoelastic resins having long relaxation times. If the applied stress of the creep test is not large enough, the resulting strain can be so small that the creep results can be influenced by the artifact of the strain drifting. In order to minimize this effect, samples were trimmed as gently as possible, and the creep test was conducted after 2000 sec of waiting time, in order to allow relaxation of any residual stress.

The appropriate magnitude of applied stress $\sigma_0$ is important for reliable creep data. The stress $\sigma_0$ must be sufficiently small such that the strain will stay within the linear viscoelastic regime, and it must be sufficiently large such that the strain signal is strong enough to provide satisfactory resolution of data for good precision. Although not limited thereto, a suitable applied stress was equal to the complex modulus $|G^*|$ at a frequency of 0.01 rad/sec multiplied by 0.04.

The long chain branches (LCB) per 1000 total carbon atoms can be calculated using the method of Janzen and Colby (*J. Mol. Struct.*, 485/486, 569-584 (1999)), from values of zero shear viscosity, $\eta_o$ (determined from the Carreau-Yasuda model, described hereinabove), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, *Polymer Preprints*, 44, 49-50 (2003). These references are incorporated herein by reference in their entirety.

Short chain branch (SCB) content and short chain branching distribution (SCBD) across the molecular weight distribution were determined via an IR5-detected GPC system (IR5-GPC), wherein the GPC system was a PL220 GPC/SEC system (Polymer Labs, an Agilent company) equipped with three Styragel HMW-6E columns (Waters, Mass.) for polymer separation. A thermoelectric-cooled IR5 MCT detector (IR5) (Polymer Char, Spain) was connected to the GPC columns via a hot-transfer line. Chromatographic data were obtained from two output ports of the IR5 detector. First, the analog signal went from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, went via a USB cable directly to Computer "B" where they were collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell were set at 150° C., while the temperature of the electronics of the IR5 detector was set at 60° C. Short chain branching content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards had known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Blow molded 1-gallon containers were produced under suitable conditions on a Uniloy reciprocating blow molding machine. The parison was extruded using a 2.5" diverging die and then blown into a mold to produce the 1-gallon containers weighing approximately 105 g.

Fluorided silica-coated aluminas used in Examples 2-7 were prepared as follows. Alumina A, from W.R. Grace Company, was first calcined in dry air at about 600° C. for approximately 6 hours, cooled to ambient temperature, and then contacted with tetraethylorthosilicate in isopropanol to equal 25 wt. % SiO$_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina was collected and stored under dry nitrogen, and was used without exposure to the atmosphere.

Pilot plant polymerizations were conducted in a 30-gallon slurry loop reactor at a production rate of approximately 30 pounds of polymer per hour. Polymerization runs were carried out under continuous particle form process conditions in a loop reactor (also referred to as a slurry process) by contacting separate metallocene solutions, an organoaluminum solution (triisobutylaluminum, TIBA), and an activator-support (fluorided silica-coated alumina) in a 1 L stirred autoclave (30 min residence time) with output to the loop reactor.

Ethylene used was polymerization grade ethylene which was purified through a column of AZ 300 (activated at 300-500° F. in nitrogen). 1-Hexene was polymerization grade 1-hexene (obtained from Chevron Phillips Chemical Company) which was purified by nitrogen purging and storage over AZ 300 activated at 300-500° F. in nitrogen. Liquid isobutane was used as the diluent.

Certain polymerization conditions for Examples 2-7 are provided in the table below (mole % ethylene and ppm by weight of triisobutylaluminum (TIBA) are based on isobutane diluent). The polymerization conditions also included a reactor pressure of 590 psig, a polymerization temperature of 90° C., a feed rate of 33.1 lb/hr ethylene, and 2.8-3.2 ppm total of MET 1 and MET 2 (based on the weight of isobutane diluent). The structures for MET 1 and MET 2, used in Examples 2-7, are shown below:

| Example | 1-Hexene (lb/hr) | H$_2$ (lb/hr) | Weight ratio MET 1/MET 2 | C$_2$H$_4$ mole % | TIBA ppm |
|---------|------------------|---------------|--------------------------|--------------------|----------|
| 2 | 0.24 | 0.0035 | 0.85 | 12.33 | 85.4 |
| 3 | 0.20 | 0.0038 | 0.81 | 11.33 | 106.5 |
| 4 | 0.21 | 0.0037 | 0.83 | 11.76 | 84.8 |
| 5 | 0.20 | 0.0037 | 0.78 | 12.43 | 112.8 |
| 6 | 0.21 | 0.0037 | 0.79 | 12.04 | 113.0 |
| 7 | 0.13 | 0.0037 | 0.77 | 12.25 | 130.4 |

Examples 1-7

Example 1 was a broad monomodal HDPE resin, having a nominal 0.35 MI and 0.955 density, produced using a chromium-based catalyst system (Chevron-Phillips Chemical Company LP). Table I and Table II summarize the molecular weight, melt index, density, and ESCR (100% igepal) characteristics of Examples 1-7, and FIG. 1 illustrates the bimodal molecular weight distributions (amount of polymer versus the logarithm of molecular weight) of the polymers of Examples 2-7 versus that of Example 1. The polymers of Examples 2-7 had Mz values ranging from about 1,500,000 to 2,000,000 g/mol, Mw values ranging from about 180,000 to about 270,000 g/mol, Mn values ranging from about 20,000 to about 24,000 g/mol, Mw/Mn values ranging from about 8.5 to about 12, and Mz/Mw values ranging from about 7 to about 9. In contrast, the polymer of Example 1 had lower Mz, Mw, Mn, Mw/Mn, and Mz/Mw values. The polymers of Examples 2-7 had densities ranging from about 0.96 to 0.961 g/cm$^3$ and MI's ranging from about 0.2 to 1 g/10 min; the polymer of Example 1 had a similar melt index but a significantly lower density (0.955). Unexpectedly, however, the ESCR (100% igepal) properties of Examples 2-7 were far superior to those of Example 1; for instance, the ESCR performance of Examples 3-7 was at least 50 times better. Hence, the polymers described herein can provide improved ESCR at an equivalent (or higher) density and/or MI, as compared to chromium-based resins.

Drop impact testing was performed on 1-gallon containers that were blow molded from the polymers of Examples 1-7, generally in accordance with ASTM D2463. Blow molded containers produced from the polymer of Example 1 passed the drop impact test at a height of 12.5 ft. Surprisingly, even with a significantly higher density, blow molded containers produced from the polymers of Examples 2 and 7 also passed the drop impact test at a height of 12.5 ft. Additionally, blow molded containers produced from the polymers of Examples 3, 4, and 6 were almost as impact resistant, surviving the drop impact test at a height of 11.5 ft. Blow molded containers produced from the polymer of Example 5 passed the drop impact test at a height of 10.3 ft.

Figure 2:
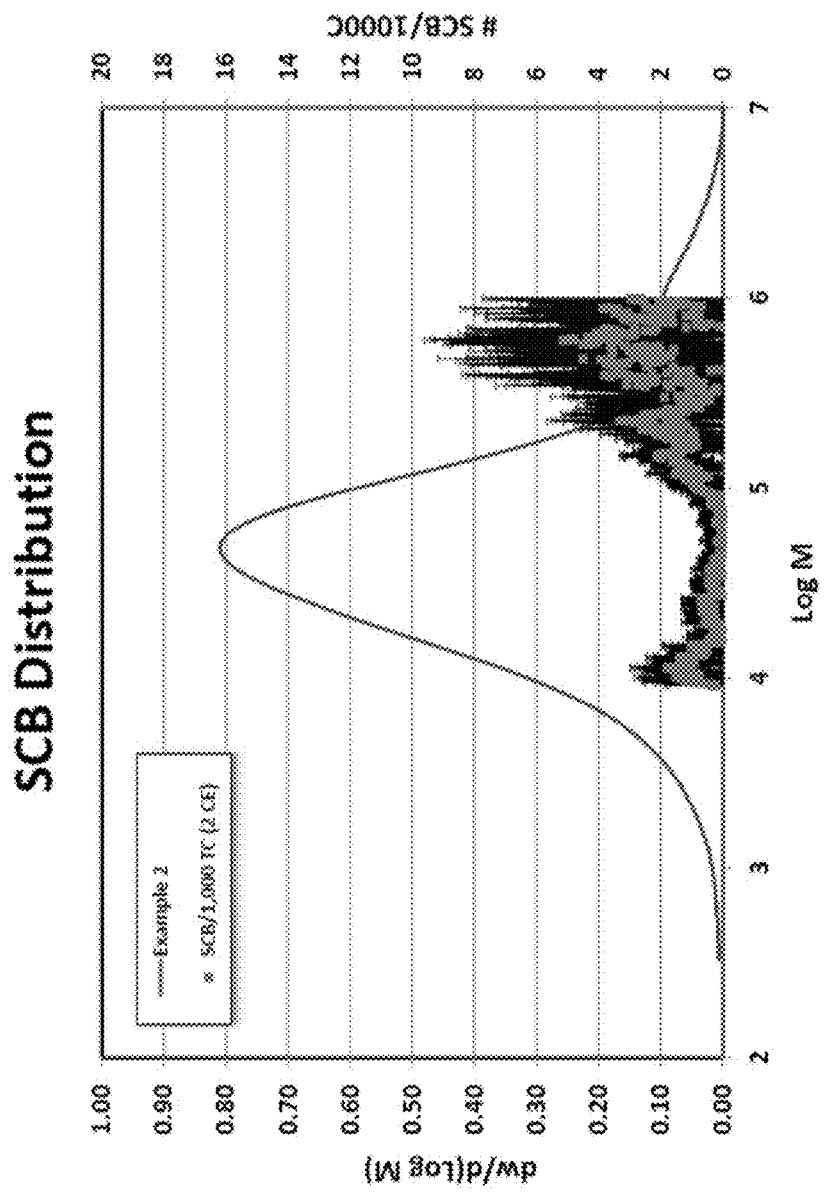
FIG. 2 presents a plot of the molecular weight distribution and short chain branch distribution of the polymer of Example 2.
Figure 3:
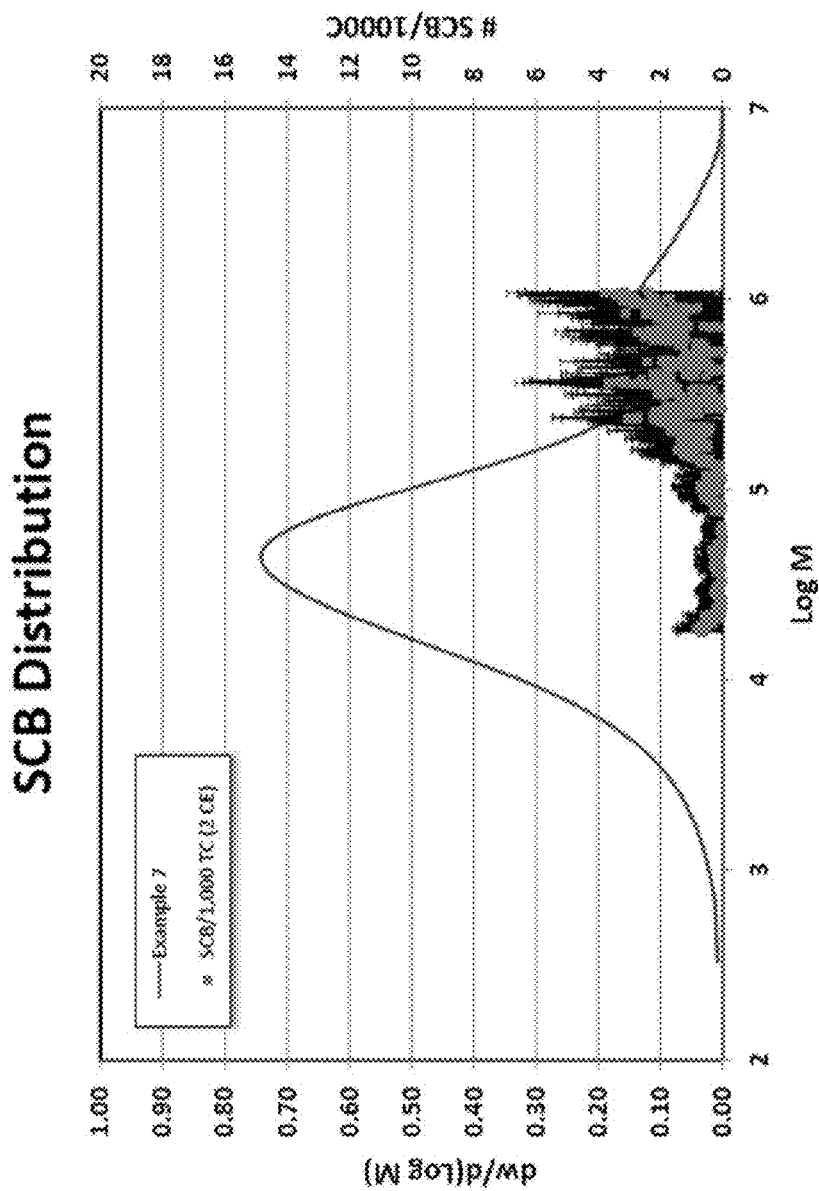
FIG. 3 presents a plot of the molecular weight distribution and short chain branch distribution of the polymer of Example 7.

As shown in FIGS. 2-3, certain polymers described herein had a reverse comonomer distribution (e.g., relatively more short chain branches (SCB) at the higher molecular weights; assumes 2 methyl chain ends (CE)), as contrasted with the standard comonomer distribution expected from a chromium-based catalyst system. For instance, in FIGS. 2-3, the number of SCB per 1000 total carbon (TC) atoms of the polymer at Mw (or Mz) is greater than at Mn for the polymers of Examples 2 and 7.

Figure 4:
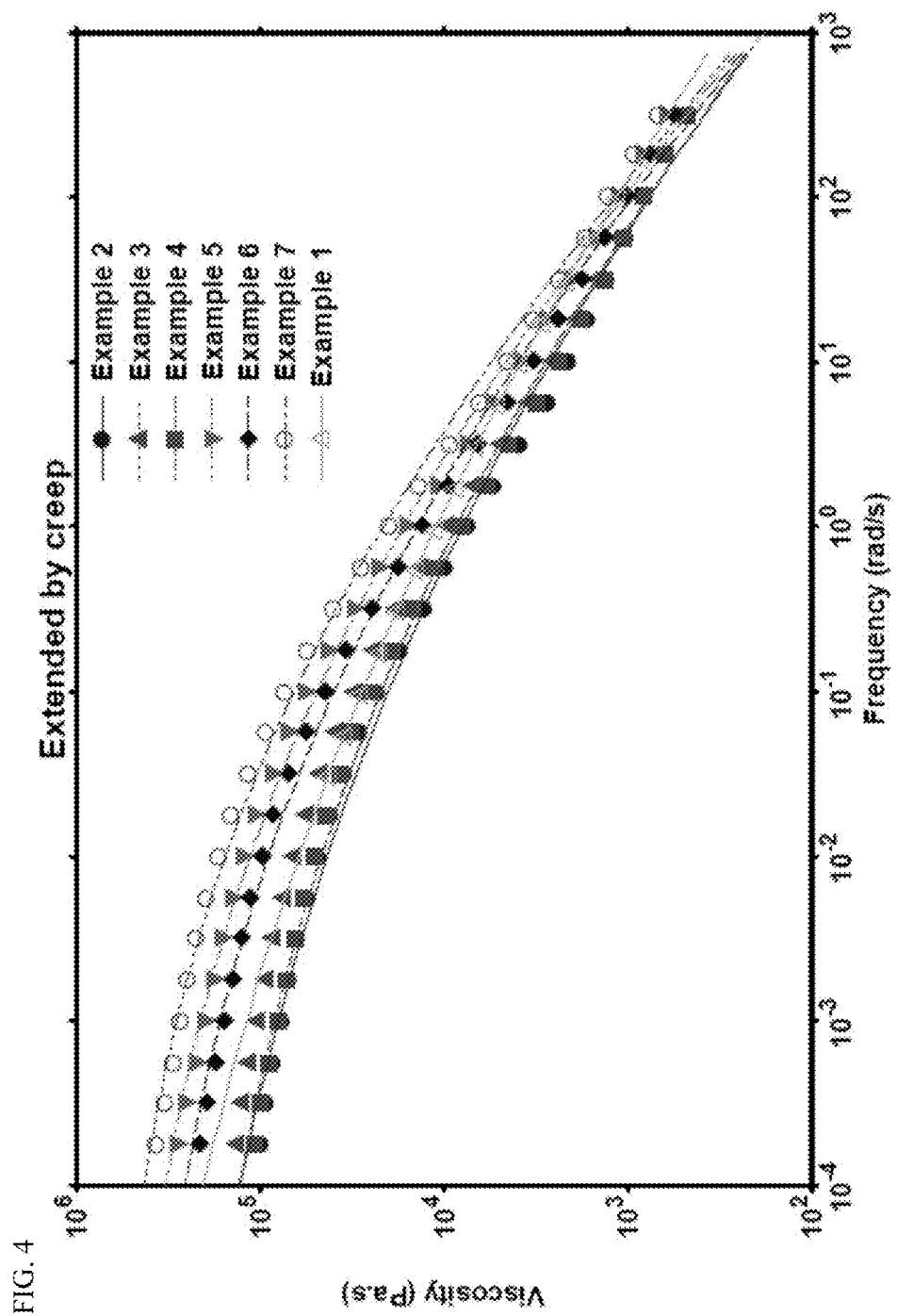
FIG. 4 presents a rheology plot (viscosity versus shear rate) at 190° C. for the polymers of Examples 1-7.
Figure 5:
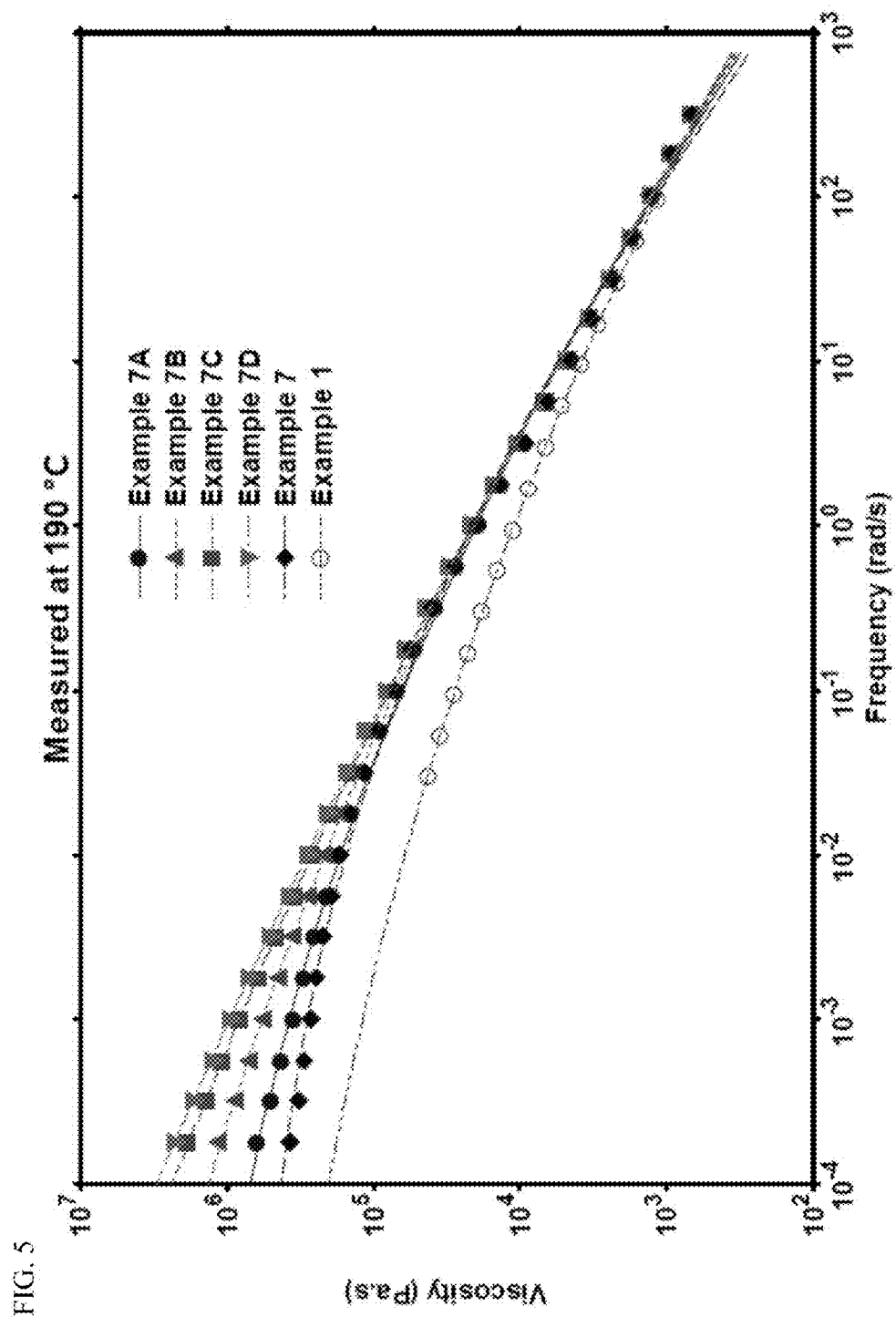
FIG. 5 presents a rheology plot (viscosity versus shear rate) at 190° C. for the polymers of Examples 1, 7, and 7A-7D.

FIGS. 4-5 illustrate the rheological properties at 190° C. for the polymers of Examples 1-7 (and 7A-7D), and Table III and Table IV summarize certain rheological characteristics of the these polymers. Surprisingly, FIG. 4 demonstrates that metallocene-based polymers (Examples 2-7) were produced

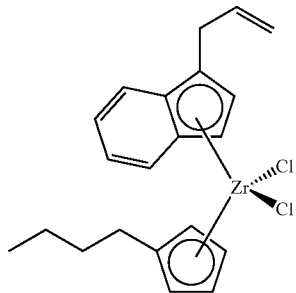

MET 1

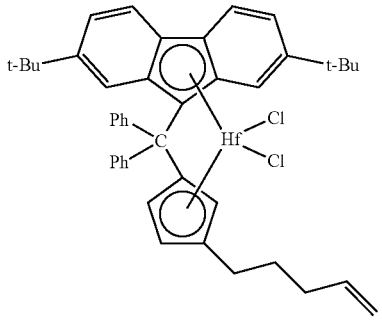

MET 2 having roughly equivalent processability to that of a chromium-based polymer (Example 1).

The polymer resin of Example 7A was prepared by first dry blending the polymer base resin of Example 7 with 1000 ppm by weight (ppmw) of a masterbatch containing a polyethylene carrier resin and 2,5-dimethyl-2,5-di(t-butylperoxy)hexane. Based on the weight percent of the two O-O groups in the compound and the loading in concentrate, the 1000 ppmw loading of the masterbatch in the base resin equated to about 50 ppmw of peroxide groups, based on the weight of the base resin. The blend of the base resin and peroxide masterbatch was compounded using a twin screw extrusion system, and then pelletized to form the ethylene/1-hexene copolymer of Example 7A. Compounding was done on a laboratory ZSK-30 twin screw extruder using nitrogen purge at the extruder feed port. A 2-hole strand die plate was used for pelletizing. Melt temperature was about 485° F. The polymers of Examples 7B, 7C, and 7D were prepared as described for Example 7A, except that the peroxide concentrate loading was 2000 ppmw, 3000 ppmw, and 4000 ppmw, respectively (100 ppmw, 150 ppmw, and 200 ppmw, respectively, of peroxide groups based on the weight of the base resin).

Table III and FIG. 5 demonstrate that the addition of peroxide generally increased the zero-shear viscosity and relaxation time, but decreased the CY-a parameter. Peroxide addition also decreased the ESCR, but the performance of the polymers of Examples 7A-7D was, unexpectedly, still far superior to that of Example 1. Hence, melt strength, which can be important in blow molding and other applications, can be increased with the addition of peroxide, while still maintaining acceptable ESCR performance.

As described herein, Applicants determined that the die swell of an ethylene polymer correlates with the rheological slope parameter, i.e., the slope of a plot of the viscosity (Pa-sec) versus shear rate (sec$^{-1}$) at 100 sec$^{-1}$ for the ethylene polymer at 190° C. Generally, the higher the rheological slope parameter, the higher the die swell. Table IV demonstrates that the polymers of Examples 7 and 7A-7D had rheological slope parameters that were comparable to that of Example 1, and thus would be expected to have comparable die swell during processing, e.g., blow molding. Peroxide addition typically decreased the rheological slope parameter. The polymers of Examples 2-6 had rheological slope parameters in the 0.45-0.57 range. The rheological parameters in Table III and Table IV were determined at 190° C. using the Carreau-Yasuda (CY) empirical model with creep adjustment, as described herein, with the exception of Example 1, where the parameters were determined without creep adjustment.

Table V summarizes the properties of the lower molecular weight (LMW) component and the higher molecular weight (HMW) component of the polymers of Examples 2-7. The respective LMW and HMW component properties were determined by deconvoluting the molecular weight distribution (see e.g., FIG. 1) of each polymer. The relative amounts of the LMW and HMW components (weight percentages) in the polymer, and Mp of the LMW component and Mp of the HMW component, were determined using a commercial software program (Systat Software, Inc., Peak Fit™ v. 4.05). The other molecular weight parameters for the LMW and HMW components (e.g., Mn, Mw, Mz, etc., of each component) were determined by using the deconvoluted data from the Peak Fit™ program, and applying a Schulz-Flory distribution mathematical function and a Gaussian peak fit, as generally described in U.S. Pat. No. 7,300,983, which is incorporated herein by reference in its entirety. The wt. % of the higher molecular weight component ranged from about 9 to 16 wt. %, Mp of the higher molecular weight component range from about 700,000 to about 1,000,000 g/mol, and Mp of the lower molecular weight component ranged from about 55,000 to about 61,000 g/mol.

TABLE I

Examples 1-7 - Molecular Weight Characterization

| Example Number | Mn (kg/mol) | Mw (kg/mol) | Mz (kg/mol) | Mw/Mn | Mz/Mw |
|---|---|---|---|---|---|
| 1 | 18.4 | 152 | 1042 | 8.3 | 6.8 |
| 2 | 20.8 | 186 | 1567 | 8.9 | 8.4 |
| 3 | 22.0 | 198 | 1626 | 9.0 | 8.2 |
| 4 | 22.4 | 189 | 1594 | 8.5 | 8.4 |
| 5 | 22.8 | 242 | 1854 | 10.6 | 7.6 |
| 6 | 22.8 | 223 | 1736 | 9.8 | 7.8 |
| 7 | 22.0 | 267 | 1986 | 12.0 | 7.4 |

TABLE II

Examples 1-7 - MI, HLMI, Density, and ESCR (100%) Characteristics

| Example Number | MI (g/10 min) | HLMI (g/10 min) | HLMI/MI | Density (g/cc) | ESCR-B (100%, hr) |
|---|---|---|---|---|---|
| 1 | 0.35 | 35 | 100 | 0.955 | 35 |
| 2 | 1.04 | 64 | 62 | 0.9600 | 409 |
| 3 | 0.62 | 62 | 100 | 0.9608 | >2000 |
| 4 | 0.82 | 75 | 91 | 0.9607 | >2000 |
| 5 | 0.34 | 38 | 112 | 0.9600 | >2000 |
| 6 | 0.42 | 44 | 105 | 0.9601 | >2000 |
| 7 | 0.23 | 29 | 126 | 0.9603 | >2000 |

TABLE III

Examples 1-7 - ESCR (10%) and Rheological Properties at 190° C.

| Example Number | Zero Shear Viscosity (Pa-sec) | Relaxation Time (sec) | Rheological Breadth CY-a Parameter | Peroxide Amount (ppm) | ESCR Condition B (10%, hr) |
|---|---|---|---|---|---|
| 1 | 1.37E+06 | 2.47E+00 | 0.1279 | 0 | |
| 2 | 4.92E+05 | | | 0 | |
| 3 | 4.20E+05 | | | 0 | |
| 4 | 3.73E+05 | | | 0 | |
| 5 | 7.13E+05 | | | 0 | |
| 6 | 5.84E+05 | | | 0 | |
| 7 | 8.03E+05 | 1.52E+01 | 0.2437 | 0 | 414 |
| 7A | 3.76E+06 | 4.98E+01 | 0.1681 | 50 | 424 |
| 7B | 5.19E+07 | 6.29E+02 | 0.1209 | 100 | 266 |
| 7C | 5.38E+09 | 5.86E+04 | 0.0813 | 150 | 227 |
| 7D | 9.85E+11 | 7.61E+06 | 0.0584 | 200 | 223 |

TABLE IV

Examples 1 and 7 - Rheological Slope Parameters at 190° C.

| Example Number | Rheological Slope Parameter @ 100 sec$^{-1}$ |
|---|---|
| 1 | 0.4455 |
| 7 | 0.4659 |
| 7A | 0.4592 |
| 7B | 0.4509 |
| 7C | 0.4456 |
| 7D | 0.4428 |

TABLE V

Lower Molecular Weight and Higher Molecular Weight Component Properties of Examples 2-7 (kg/mol)

| | Lower Molecular Component Properties | | | | | | | Higher Molecular Weight Component Properties | | | | | | |
|---|---|---|---|---|---|---|---|---|---|---|---|---|---|---|
| Example | % | Mn | Mw | Mz | Mp | Mw/Mn | Mz/Mw | % | Mn | Mw | Mz | Mp | Mw/Mn | Mz/Mw |
| 2 | 91 | 19.0 | 69.1 | 136 | 58.9 | 3.6 | 2.0 | 9 | 554 | 1110 | 1907 | 851 | 2.0 | 1.7 |
| 3 | 90 | 16.8 | 65.2 | 128 | 56.2 | 3.9 | 2.0 | 10 | 571 | 1089 | 1819 | 871 | 1.9 | 1.7 |
| 4 | 89 | 16.4 | 61.9 | 118 | 55.0 | 3.8 | 1.9 | 11 | 340 | 879 | 1597 | 741 | 2.6 | 1.8 |
| 5 | 84 | 15.7 | 63.7 | 121 | 57.5 | 4.1 | 1.9 | 16 | 243 | 978 | 1814 | 891 | 4.0 | 1.9 |
| 6 | 86 | 15.8 | 63.8 | 123 | 55.0 | 4.0 | 1.9 | 14 | 321 | 1005 | 1809 | 891 | 3.1 | 1.8 |
| 7 | 84 | 17.2 | 66.3 | 129 | 60.3 | 3.8 | 1.9 | 16 | 362 | 1107 | 2038 | 955 | 3.0 | 1.8 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

An ethylene polymer comprising a higher molecular weight component and a lower molecular weight component, wherein the ethylene polymer has a density of greater than or equal to about 0.945 g/cm$^3$, a melt index (MI) of less than or equal to about 1.5 g/10 min, a ratio of high load melt index to melt index (HLMI/MI) in a range from about 40 to about 175, and a slope of a plot of the viscosity (Pa-sec) versus shear rate (sec$^{-1}$) of the ethylene polymer at 100 sec$^{-1}$ in a range from about 0.42 to about 0.65.

Embodiment 2

An ethylene polymer comprising a higher molecular weight component and a lower molecular weight component, wherein the ethylene polymer has a density of greater than or equal to about 0.945 g/cm$^3$, a melt index (MI) of less than or equal to about 1.5 g/10 min, a ratio of high load melt index to melt index (HLMI/MI) in a range from about 40 to about 175, a peak molecular weight (Mp) of the higher molecular weight component in a range from about 650,000 to about 1,100,000 g/mol, a Mp of the lower molecular weight component in a range from about 40,000 to about 80,000 g/mol, and a ratio of Mw/Mn in a range from about 5 to about 18.

Embodiment 3

The polymer defined in embodiment 1 or 2, wherein the ethylene polymer has an environmental stress crack resistance (ESCR, 100% igepal) in any range disclosed herein, e.g., at least 400 hours, at least 600 hours, at least 1,000 hours, at least 1,500 hours, at least 2,000 hours, etc., and/or the ethylene polymer has an environmental stress crack resistance (ESCR, 10% igepal) in any range disclosed herein, e.g., at least 100 hours, at least 150 hours, at least 200 hours, at least 250 hours, at least 400 hours, etc.

Embodiment 4

The polymer defined in any one of embodiments 1-3, wherein the ethylene polymer has a MI in any range disclosed herein, e.g., from 0 to about 1, from about 0.05 to about 1.2, from about 0.1 to about 0.9, from about 0.2 to about 0.9, from about 0.2 to about 0.8 g/10 min, etc.

Embodiment 5

The polymer defined in any one of embodiments 1-4, wherein the ethylene polymer has a ratio of HLMI/MI in any range disclosed herein, e.g., from about 50 to about 175, from about 50 to about 150, from about 60 to about 160, from about 45 to about 145, from about 50 to about 130, etc.

Embodiment 6

The polymer defined in any one of embodiments 1-5, wherein the ethylene polymer has a density in any range disclosed herein, e.g., greater than or equal to about 0.95, greater than or equal to about 0.955, from about 0.945 to about 0.965, from about 0.95 to about 0.965, from about 0.95 to about 0.962, from about 0.955 to about 0.965, from about 0.957 to about 0.963 g/cm$^3$, etc.

Embodiment 7

The polymer defined in any one of embodiments 1-6, wherein the ethylene polymer has a slope of a plot of the viscosity (Pa-sec) versus shear rate (sec$^{-1}$) of the ethylene polymer at 100 sec$^{-1}$ (and 190° C.) in any range disclosed herein, e.g., from about 0.42 to about 0.6, from about 0.42 to about 0.55, from about 0.44 to about 0.65, from about 0.44 to about 0.55, from about 0.45 to about 0.6, etc.

Embodiment 8

The polymer defined in any one of embodiments 1-7, wherein the higher molecular weight component has a Mp in any range disclosed herein, e.g., from about 700,000 to about 1,100,000, from about 650,000 to about 1,000,000, from about 700,000 to about 1,000,000, from about 725,000 to about 975,000 g/mol, etc.

Embodiment 9

The polymer defined in any one of embodiments 1-8, wherein the lower molecular weight component has a Mp in any range disclosed herein, e.g., from about 40,000 to about 75,000, from about 45,000 to about 80,000, from about 45,000 to about 75,000, from about 45,000 to about 70,000 g/mol, etc.

Embodiment 10

The polymer defined in any one of embodiments 1-9, wherein the higher molecular weight component has a weight-average molecular weight (Mw) in any range disclosed herein, e.g., from about 825,000 to about 1,500,000, from about 825,000 to about 1,300,000, from about 850,000 to about 1,350,000, from about 850,000 to about 1,250,000 g/mol, etc.

Embodiment 11

The polymer defined in any one of embodiments 1-10, wherein the lower molecular weight component has a weight-average molecular weight (Mw) in any range disclosed herein, e.g., from about 45,000 to about 85,000, from about 45,000 to about 80,000, from about 50,000 to about 80,000, from about 55,000 to about 80,000 g/mol, etc.

Embodiment 12

The polymer defined in any one of embodiments 1-11, wherein the higher molecular weight component has a number-average molecular weight (Mn) in any range disclosed herein, e.g., from about 175,000 to about 700,000, from about 175,000 to about 600,000, from about 200,000 to about 650,000, from about 200,000 to about 600,000 g/mol, etc.

Embodiment 13

The polymer defined in any one of embodiments 1-12, wherein the lower molecular weight component has a number-average molecular weight (Mn) in any range disclosed herein, e.g., from about 8,000 to about 35,000, from about 10,000 to about 35,000, from about 10,000 to about 30,000, from about 12,000 to about 25,000 g/mol, etc.

Embodiment 14

The polymer defined in any one of embodiments 1-13, wherein the ethylene polymer has a Mw in any range disclosed herein, e.g., from about 150,000 to about 375,000, from about 150,000 to about 350,000, from about 150,000 to about 300,000, from about 175,000 to about 375,000, from about 175,000 to about 350,000, from about 175,000 to about 300,000 g/mol, etc.

Embodiment 15

The polymer defined in any one of embodiments 1-14, wherein the ethylene polymer has a Mn in any range disclosed herein, e.g., from about 10,000 to about 40,000, from about 12,000 to about 35,000, from about 12,000 to about 30,000, from about 15,000 to about 40,000, from about 15,000 to about 35,000 g/mol, etc.

Embodiment 16

The polymer defined in any one of embodiments 1-15, wherein the ethylene polymer has a z-average molecular weight (Mz) in any range disclosed herein, e.g., from about 800,000 to about 4,000,000, from about 900,000 to about 3,500,000, from about 1,000,000 to about 4,000,000, from about 1,000,000 to about 3,000,000, from about 900,000 to about 2,500,000 g/mol, etc.

Embodiment 17

The polymer defined in any one of embodiments 1-16, wherein the ethylene polymer has a ratio of Mw/Mn in any range disclosed herein, e.g., from about 5 to about 18, from about 5 to about 15, from about 6 to about 18, from about 6 to about 15, from about 7 to about 18, from about 7 to about 15, from about 8 to about 14, etc.

Embodiment 18

The polymer defined in any one of embodiments 1-17, wherein the ethylene polymer has a ratio of Mz/Mw in any range disclosed herein, e.g., from about 5 to about 12, from about 5.5 to about 11, from about 6 to about 10, from about 6.5 to about 9.5, etc.

Embodiment 19

The polymer defined in any one of embodiments 1-18, wherein the higher molecular weight component has a ratio of Mz/Mw in any range disclosed herein, e.g., less than or equal to about 2.5, less than or equal to about 2.2, from about 1.5 to about 2.5, from about 1.5 to about 2.2, etc.

Embodiment 20

The polymer defined in any one of embodiments 1-19, wherein the lower molecular weight component has a ratio of Mz/Mw in any range disclosed herein, e.g., less than or equal to about 2.8, less than or equal to about 2.5, from about 1.5 to about 2.8, from about 1.6 to about 2.5, from about 1.6 to about 2.4, etc.

Embodiment 21

The polymer defined in any one of embodiments 1-20, wherein an amount of the higher molecular weight component, based on the total polymer, is in any range of weight percentages disclosed herein, e.g., less than or equal to about 35%, less than or equal to about 30%, less than or equal to about 25%, less than or equal to about 22%, less than or equal to about 20%, from about 5 to about 30%, from about 4 to about 25%, from about 5 to about 22%, from about 5 to about 20%, from about 6 to about 25%, from about 6 to about 22%, etc.

Embodiment 22

The polymer defined in any one of embodiments 1-21, wherein the ethylene polymer has a HLMI in any range disclosed herein, e.g., from about 15 to about 100, from about 20 to about 90, from about 20 to about 85, from about 35 to about 100, from about 15 to about 75, from about 30 to about 80 g/10 min, etc.

Embodiment 23

The polymer defined in any one of embodiments 1-22, wherein the ethylene polymer has less than about 0.008 long chain branches (LCB) per 1000 total carbon atoms, e.g., less than about 0.005 LCB, less than about 0.003 LCB, etc.

Embodiment 24

The polymer defined in any one of embodiments 1-23, wherein the ethylene polymer has a non-conventional (flat or reverse) comonomer distribution, e.g., the number of short chain branches (SCB) per 1000 total carbon atoms of the polymer at Mw is greater than or equal to the number at Mn, the number of short chain branches (SCB) per 1000 total carbon atoms of the polymer at Mz is greater than or equal to the number at Mw, the number of SCB per 1000 total carbon atoms of the polymer at Mz is greater than or equal to the number at Mn, the number of short chain branches (SCB) per 1000 total carbon atoms of the polymer at a molecular weight of $10^6$ is greater than or equal to the number at a molecular weight of $10^5$, etc.

Embodiment 25

The polymer defined in any one of embodiments 1-24, wherein the ethylene polymer has a CY-a parameter in any range disclosed herein, e.g., from about 0.02 to about 0.3, from about 0.04 to about 0.2, from about 0.04 to about 0.18, etc.

Embodiment 26

The polymer defined in any one of embodiments 1-25, wherein the ethylene polymer has a zero-shear viscosity (using the Carreau-Yasuda model with creep adjustment) in any range disclosed herein, e.g., greater than or equal to about $1 \times 10^5$, greater than or equal to about $2 \times 10^5$, in a range from about $1 \times 10^5$ to about $1 \times 10^7$, in a range from about $2 \times 10^5$ to about $1 \times 10^7$ Pa-sec, etc.

Embodiment 27

The polymer defined in any one of embodiments 1-26, wherein the ethylene polymer has a zero-shear viscosity (using the Carreau-Yasuda model with creep adjustment) in any range disclosed herein, e.g., greater than or equal to about $1 \times 10^6$, greater than or equal to about $2 \times 10^6$, in a range from about $1 \times 10^6$ to about $1 \times 10^{14}$, in a range from about $2 \times 10^6$ to about $1 \times 10^{12}$ Pa-sec, etc.

Embodiment 28

The polymer defined in any one of embodiments 1-27, wherein the ethylene polymer has a bimodal molecular weight distribution.

Embodiment 29

The polymer defined in any one of embodiments 1-28, wherein the ethylene polymer is a single reactor product, e.g., not a post-reactor blend of two polymers, for instance, having different molecular weight characteristics.

Embodiment 30

The polymer defined in any one of embodiments 1-29, wherein the ethylene polymer is an ethylene/α-olefin copolymer.

Embodiment 31

The polymer defined in any one of embodiments 1-30, wherein the ethylene polymer is an ethylene/1-butene copolymer, an ethylene/1-hexene copolymer, or an ethylene/1-octene copolymer.

Embodiment 32

The polymer defined in any one of embodiments 1-31, wherein the ethylene polymer is an ethylene/1-hexene copolymer.

Embodiment 33

The polymer defined in any one of embodiments 1-32, wherein the ethylene polymer is produced by a process comprising contacting a base resin with a peroxide compound at a temperature sufficient to generate peroxide groups at 10-400 ppm of peroxide groups based on the weight of the base resin.

Embodiment 34

The polymer defined in embodiment 33, wherein the step of contacting the base resin with the peroxide compound comprises melt processing a blend (or mixture) of the base resin and the peroxide compound at any melt processing temperature disclosed herein, e.g., in a range from about 120 to about 300° C., in a range from about 150 to about 250° C., in a range from about 175 to about 225° C., etc.

Embodiment 35

The polymer defined in embodiment 34, wherein the melt processing is performed in a twin screw extrusion system.

Embodiment 36

The polymer defined in embodiment 34, wherein the melt processing is performed in a single screw extrusion system.

Embodiment 37

The polymer defined in any one of embodiments 33-36, wherein the base resin is an ethylene polymer having the polymer characteristics defined in any one of embodiments 1-32.

Embodiment 38

The polymer defined in any one of embodiments 1-37, wherein the base resin and/or the ethylene polymer is/are produced using a Ziegler-Natta catalyst system.

Embodiment 39

The polymer defined in any one of embodiments 1-37, wherein the base resin and/or the ethylene polymer is/are produced using a metallocene-based catalyst system.

Embodiment 40

The polymer defined in embodiment 39, wherein the metallocene-based catalyst system comprises catalyst component I comprising any unbridged metallocene compound disclosed herein, catalyst component II comprising any bridged metallocene compound disclosed herein, any activator disclosed herein, and optionally, any co-catalyst disclosed herein.

Embodiment 41

The polymer defined in embodiment 40, wherein catalyst component I comprises an unbridged zirconium or hafnium based metallocene compound containing two cyclopentadienyl groups, two indenyl groups, or a cyclopentadienyl and an indenyl group.

Embodiment 42

The polymer defined in embodiment 40, wherein catalyst component I comprises an unbridged metallocene compound having formula (I):

(I)

wherein M is any Group IV transition metal disclosed herein, $Cp^A$ and $Cp^B$ independently are any cyclopentadienyl or indenyl group disclosed herein, and each X independently is any monoanionic ligand disclosed herein.

Embodiment 43

The polymer defined in any one of embodiments 40-42, wherein catalyst component II comprises a bridged zirconium or hafnium based metallocene compound with a cyclopentadienyl group and a fluorenyl group, and with an alkenyl substituent on the bridging group and/or on the cyclopentadienyl group.

Embodiment 44

The polymer defined in any one of embodiments 40-42, wherein catalyst component II comprises a bridged metallocene compound having formula (II):

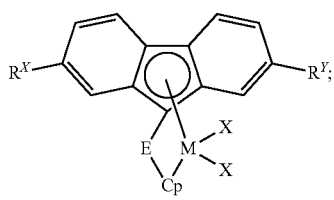

(II)

wherein M is any Group IV transition metal disclosed herein, Cp is any cyclopentadienyl, indenyl, or fluorenyl group disclosed herein, each X independently is any monoanionic ligand disclosed herein, $R^X$ and $R^Y$ independently are any substituent disclosed herein, and E is any bridging group disclosed herein.

Embodiment 45

The polymer defined in any one of embodiments 40-44, wherein the activator comprises an activator-support, an aluminoxane compound, an organoboron or organoborate compound, an ionizing ionic compound, or any combination thereof.

Embodiment 46

The polymer defined in any one of embodiments 40-45, wherein the activator comprises an aluminoxane compound.

Embodiment 47

The polymer defined in any one of embodiments 40-45, wherein the activator comprises an activator-support, the activator-support comprising any solid oxide treated with any electron-withdrawing anion disclosed herein.

Embodiment 48

The polymer defined in embodiment 47, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 49

The polymer defined in embodiment 47, wherein the activator-support comprises a fluorided solid oxide and/or a sulfated solid oxide.

Embodiment 50

The polymer defined in any one of embodiments 40-49, wherein the metallocene-based catalyst system comprises a co-catalyst, e.g., any co-catalyst disclosed herein.

Embodiment 51

The polymer defined in embodiment 50, wherein the co-catalyst comprises any organoaluminum compound disclosed herein, e.g., trimethylaluminum, triethylaluminum, triisobutylaluminum, etc.

Embodiment 52

The polymer defined in any one of embodiments 40-51, wherein a weight ratio of catalyst component I to catalyst component II in the catalyst system is in any range disclosed herein, e.g., from about 10:1 to about 1:10, from about 5:1 to about 1:5, from about 2:1 to about 1:2, etc.

Embodiment 53

The polymer defined in any one of embodiments 1-52, wherein the base resin and/or the ethylene polymer is/are produced in any polymerization reactor system and under any polymerization conditions disclosed herein.

Embodiment 54

The polymer defined in embodiment 53, wherein the polymerization reactor system comprises a batch reactor, a slurry reactor, a gas-phase reactor, a solution reactor, a high pressure reactor, a tubular reactor, an autoclave reactor, or a combination thereof.

Embodiment 55

The polymer defined in embodiment 53, wherein the polymerization reactor system comprises a slurry reactor, a gas-phase reactor, a solution reactor, or a combination thereof.

Embodiment 56

The polymer defined in embodiment 53, wherein the polymerization reactor system comprises a loop slurry reactor.

Embodiment 57

The polymer defined in any one of embodiments 53-56, wherein the polymerization reactor system comprises a single reactor, 2 reactors, or more than 2 reactors.

Embodiment 58

The polymer defined in any one of embodiments 53-57, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 59

The polymer defined in any one of embodiments 53-58, wherein the polymerization conditions are substantially constant, e.g., for a particular polymer grade.

Embodiment 60

The polymer defined in any one of embodiments 53-59, wherein hydrogen is added to the polymerization reactor system.

Embodiment 61

An article of manufacture (e.g., a blow molded article) comprising the ethylene polymer (or base resin) defined in any one of embodiments 1-60.

Embodiment 62

An article comprising the ethylene polymer (or base resin) defined in any one of embodiments 1-60, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. An ethylene polymer comprising a higher molecular weight component and a lower molecular weight component, wherein the ethylene polymer has a density of greater than or equal to about 0.95 g/cm$^3$, a melt index (MI) in a range from about 0.05 to about 1.5 g/10 min, a ratio of high load melt index to melt index (HLMI/MI) in a range from about 40 to about 175, a bimodal molecular weight distribution, less than about 0.008 long chain branches per 1000 total carbon atoms, a non-conventional comonomer distribution, and a slope of a plot of the viscosity (Pa-sec) versus shear rate (sec$^{-1}$) at 190° C. of the ethylene polymer at 100 sec$^{-1}$ in a range from about 0.42 to about 0.65.

2. The polymer of claim 1, wherein the ethylene polymer has:
   a density in a range from about 0.95 to about 0.965 g/cm$^3$;
   a HLMI in a range from about 15 to about 100 g/10 min;
   an ESCR (100% igepal) of at least 1000 hours; and
   an ESCR (10% igepal) of at least 200 hours.

3. The polymer of claim 1, wherein the ethylene polymer has:
   a ratio of Mw/Mn in a range from about 6 to about 18;
   a ratio of Mz/Mw in a range from about 6 to about 10;
   a Mw in a range from about 150,000 to about 375,000 g/mol;
   a Mn in a range from about 12,000 to about 35,000 g/mol; or
   a Mz in a range from about 1,000,000 to about 3,000,000 g/mol; or
   any combination thereof.

4. The polymer of claim 1, wherein the ethylene polymer has:
   a melt index in a range from about 0.1 to about 1 g/10 min;
   a ratio of HLMI/MI in a range from about 60 to about 160; and
   a density in a range from about 0.955 to about 0.965 g/cm$^3$.

5. The polymer of claim 4, wherein the ethylene polymer is an ethylene/α-olefin copolymer.

6. The polymer of claim 1, wherein the ethylene polymer has:
   a CY-a parameter at 190° C. in a range from about 0.02 to about 0.3; and
   the slope of the plot of the viscosity (Pa-sec) versus shear rate (sec$^{-1}$) at 190° C. of the ethylene polymer at 100 sec$^{-1}$ in a range from about 0.44 to about 0.5.

7. The polymer of claim 1, wherein the ethylene polymer is produced by a process comprising melt processing a mixture of a base resin and a peroxide compound in a twin screw extrusion system at a temperature in a range from about 120 to about 300° C. to generate peroxide groups at about 10-400 ppm of peroxide groups based on the weight of the base resin.

8. The polymer of claim 1, wherein the ethylene polymer is an ethylene/1-butene copolymer, an ethylene/1-hexene copolymer, or an ethylene/1-octene copolymer.

9. An article comprising the ethylene polymer of claim 1.

10. A blow molded article comprising the ethylene polymer of claim 1.

11. An ethylene polymer comprising a higher molecular weight component and a lower molecular weight component, wherein the ethylene polymer has a density of greater than or equal to about 0.95 g/cm$^3$, a melt index (MI) in a range from about 0.05 to about 1.5 g/10 min, a ratio of high load melt index to melt index (HLMI/MI) in a range from about 40 to about 175, a peak molecular weight (Mp) of the higher molecular weight component in a range from about 650,000 to about 1,100,000 g/mol, a Mp of the lower molecular weight component in a range from about 40,000 to about 80,000 g/mol, less than about 0.008 long chain branches per 1000 total carbon atoms, a non-conventional comonomer distribution, and a ratio of Mw/Mn in a range from about 5 to about 18.

12. The polymer of claim 11, wherein the lower molecular weight component has:
   a ratio of Mz/Mw in a range from about 1.5 to about 2.8;
   a Mp in a range from about 45,000 to about 75,000 g/mol;
   a Mw in a range from about 50,000 to about 80,000 g/mol; and
   a Mn in a range from about 10,000 to about 30,000 g/mol.

13. The polymer of claim 11, wherein the higher molecular weight component has:
   a ratio of Mz/Mw in a range from about 1.5 to about 2.5;
   a Mp in a range from about 700,000 to about 1,100,000 g/mol;
   a Mw in a range from about 825,000 to about 1,500,000 g/mol; and
   a Mn in a range from about 175,000 to about 700,000 g/mol.

14. The polymer of claim 11, wherein the ethylene polymer has:
   a density in a range from about 0.95 to about 0.965 g/cm$^3$;
   a HLMI in a range from about 15 to about 100 g/10 min;
   an ESCR (100% igepal) of at least 1000 hours; and
   an ESCR (10% igepal) of at least 200 hours.

15. The polymer of claim 14, wherein the ethylene polymer has:
   a ratio of Mw/Mn in a range from about 6 to about 16; and
   less than or equal to about 22 wt % of the higher molecular weight component.

16. The polymer of claim 15, wherein the ethylene polymer has:
   a melt index in a range from about 0.2 to about 0.9.

17. The polymer of claim 11, wherein the ethylene polymer is an ethylene/1-butene copolymer, an ethylene/1-hexene copolymer, or an ethylene/1-octene copolymer.

18. An article comprising the ethylene polymer of claim 11.

19. A blow molded article comprising the ethylene polymer of claim 11.

20. An ethylene polymer comprising a higher molecular weight component and a lower molecular weight component, wherein the ethylene polymer has a density of greater than or equal to about 0.95 g/cm$^3$, a melt index (MI) in a range from about 0.05 to about 1.5 g/10 min, a ratio of high load melt index to melt index (HLMI/MI) in a range from about 40 to about 175, and a slope of a plot of the viscosity (Pa-sec) versus shear rate (sec$^{-1}$) at 190° C. of the ethylene polymer at 100 sec$^{-1}$ in a range from about 0.42 to about 0.65, and wherein the lower molecular weight component has a ratio of Mz/Mw in a range from about 1.5 to about 2.8.

21. The polymer of claim 20, wherein the ethylene polymer has:
   a density in a range from about 0.95 to about 0.965 g/cm$^3$;
   an ESCR (100% igepal) of at least 1000 hours; and
   an ESCR (10% igepal) of at least 200 hours.

22. The polymer of claim 21, wherein the ethylene polymer is an ethylene/1-butene copolymer, an ethylene/1-hexene copolymer, or an ethylene/1-octene copolymer.

23. A blow molded article comprising the ethylene polymer of claim 22.

24. An ethylene polymer comprising a higher molecular weight component and a lower molecular weight component, wherein the ethylene polymer has a density of greater than or equal to about 0.95 g/cm$^3$, a melt index (MI) in a range from about 0.05 to about 1.5 g/10 min, a ratio of high load melt index to melt index (HLMI/MI) in a range from about 40 to about 175, a peak molecular weight (Mp) of the higher molecular weight component in a range from about 650,000 to about 1,100,000 g/mol, a Mp of the lower molecular weight component in a range from about 40,000 to about 80,000 g/mol, a ratio of Mz/Mw of the lower molecular weight component in a range from about 1.5 to about 2.8, and a ratio of Mw/Mn in a range from about 5 to about 18.

25. The polymer of claim 24, wherein the ethylene polymer has:
   a density in a range from about 0.95 to about 0.965 g/cm$^3$;
   an ESCR (100% igepal) of at least 1000 hours; and
   an ESCR (10% igepal) of at least 200 hours.

26. The polymer of claim 25, wherein the ethylene polymer is an ethylene/1-butene copolymer, an ethylene/1-hexene copolymer, or an ethylene/1-octene copolymer.

27. A blow molded article comprising the ethylene polymer of claim 26.

* * * * *